US009109403B2

(12) United States Patent
Logan et al.

(10) Patent No.: US 9,109,403 B2
(45) Date of Patent: Aug. 18, 2015

(54) DRILL BIT ASSEMBLY HAVING ELECTRICALLY ISOLATED GAP JOINT FOR ELECTROMAGNETIC TELEMETRY

(75) Inventors: Derek Logan, Calgary (CA); Garry Holmen, Calgary (CA); Tony Dopf, Calgary (CA); Aaron Logan, Calgary (CA); Rob Utter, Sugar Land, TX (US); Brian Clark, Sugar Land, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 896 days.

(21) Appl. No.: 13/266,064

(22) PCT Filed: Oct. 29, 2009
(Under 37 CFR 1.47)

(86) PCT No.: PCT/CA2009/001568
§ 371 (c)(1),
(2), (4) Date: Oct. 24, 2011

(87) PCT Pub. No.: WO2010/121345
PCT Pub. Date: Oct. 28, 2010

(65) Prior Publication Data
US 2012/0085583 A1   Apr. 12, 2012

Related U.S. Application Data

(60) Provisional application No. 61/172,187, filed on Apr. 23, 2009.

(51) Int. Cl.
*E21B 49/00* (2006.01)
*B21K 5/04* (2006.01)
(Continued)

(52) U.S. Cl.
CPC ............... *E21B 10/00* (2013.01); *E21B 17/028* (2013.01); *E21B 17/042* (2013.01); *E21B 47/122* (2013.01); *F16L 25/02* (2013.01)

(58) Field of Classification Search
CPC ...... E21B 10/00; E21B 17/042; E21B 47/122; E21B 47/12; E21B 17/003; E21B 17/028; E21B 17/046; G01V 3/24; G01V 3/20; F16L 25/02; F16L 25/021
See application file for complete search history.

(56) References Cited

U.S. PATENT DOCUMENTS

| | | | | |
|---|---|---|---|---|
| 4,496,174 A | * | 1/1985 | McDonald et al. | 285/53 |
| 4,674,773 A | * | 6/1987 | Stone et al. | 285/48 |

(Continued)

FOREIGN PATENT DOCUMENTS

| | | |
|---|---|---|
| CA | 2496170 | 8/2006 |
| CA | 2577734 | 8/2008 |
| GB | 2064041 | 10/1981 |

*Primary Examiner* — Daniel P Stephenson
(74) *Attorney, Agent, or Firm* — Chadwick A. Sullivan; Wesley Noah

(57) ABSTRACT

A drill bit assembly having an electrically isolated gap joint for electromagnetic telemetry comprises a drill bit, a pin body, an electrically insulating gap joint therebetween, and an electrical conductor extending across the gap joint. The bit head has a cutting end and an opposite connecting end with an engagement section. The pin body has a tubular body with an axial bore therethrough, and comprises a connecting end with an engagement section. The pin body connecting end is connected to the bit head connecting end such that the engagement sections overlap. The electrically insulating gap joint fills an annular gap between the bit head and pin body engagement sections such that the bit head and pin body are mechanically connected together at the connecting ends but are electrically separated. The electrical conductor has one end electrically contacting one of the bit head and pin body, and the other end communicable with electronics equipment.

22 Claims, 27 Drawing Sheets

(51) Int. Cl.
  *E21B 10/00* (2006.01)
  *E21B 17/02* (2006.01)
  *F16L 25/02* (2006.01)
  *E21B 17/042* (2006.01)
  *E21B 47/12* (2012.01)

(56) References Cited

U.S. PATENT DOCUMENTS

| | | | |
|---|---|---|---|
| 4,691,203 A * | 9/1987 | Rubin et al. | 340/855.2 |
| 4,739,325 A * | 4/1988 | MacLeod | 340/854.4 |
| 4,933,640 A * | 6/1990 | Kuckes | 324/339 |
| 5,113,953 A | 5/1992 | Noble | |
| 5,130,706 A * | 7/1992 | Van Steenwyk | 340/854.6 |
| 5,265,682 A | 11/1993 | Russell et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,778,992 A | 7/1998 | Fuller | |
| 5,803,185 A | 9/1998 | Barr et al. | |
| 5,883,516 A * | 3/1999 | Van Steenwyk et al. | 324/366 |
| 5,971,085 A | 10/1999 | Colebrook | |
| 6,050,353 A | 4/2000 | Logan et al. | |
| 6,089,332 A | 7/2000 | Barr et al. | |
| 6,092,610 A | 7/2000 | Kosmala et al. | |
| 6,158,529 A | 12/2000 | Dorel | |
| 6,158,532 A | 12/2000 | Logan et al. | |
| 6,244,361 B1 | 6/2001 | Comeau et al. | |
| 6,364,034 B1 | 4/2002 | Schoeffler | |
| 6,394,193 B1 | 5/2002 | Askew | |
| 6,515,592 B1 * | 2/2003 | Babour et al. | 340/854.4 |
| 7,301,345 B2 | 11/2007 | Chen et al. | |
| 7,387,167 B2 | 6/2008 | Fraser et al. | |
| 8,171,613 B2 * | 5/2012 | Reynolds, Jr. | 29/458 |
| 2001/0052428 A1 | 12/2001 | Larronde et al. | |
| 2002/0011359 A1 | 1/2002 | Webb et al. | |
| 2006/0089804 A1 * | 4/2006 | Chen et al. | 702/1 |
| 2007/0057674 A1 * | 3/2007 | Chen et al. | 324/347 |
| 2008/0191900 A1 * | 8/2008 | Camwell et al. | 340/854.3 |
| 2009/0066336 A1 * | 3/2009 | Dion | 324/355 |
| 2012/0085583 A1 * | 4/2012 | Logan et al. | 175/50 |
| 2013/0043874 A1 * | 2/2013 | Clark et al. | 324/369 |

* cited by examiner

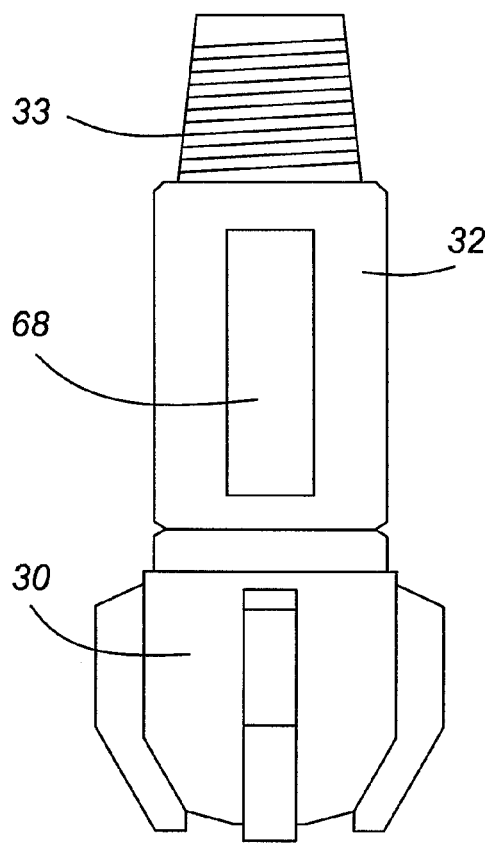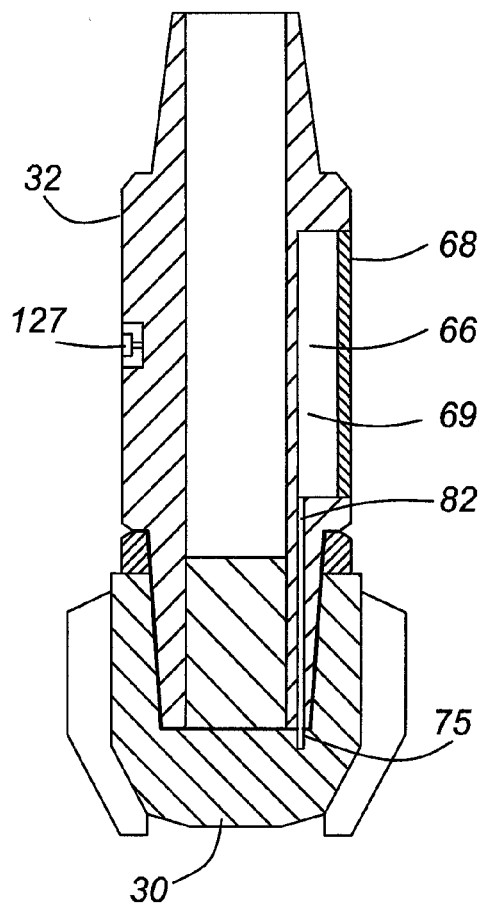
FIG. 6(a)          FIG. 6(b)

DRILL BIT ASSEMBLY HAVING ELECTRICALLY ISOLATED GAP JOINT FOR ELECTROMAGNETIC TELEMETRY

FIELD OF THE INVENTION

This invention relates generally to drilling equipment used in drilling bore holes in earth formations, and in particular to a drill bit assembly having an electrically isolated gap joint used for electromagnetic telemetry and/or measuring reservoir formation properties.

BACKGROUND OF THE INVENTION

Modern drilling techniques employ an increasing number of sensors in downhole tools to determine downhole conditions and parameters such as pressure, spatial orientation, temperature, gamma ray count etc. that are encountered during drilling. These sensors are usually employed in logging while drilling (LWD) and 'measurement while drilling' (MWD). The data from such sensors are either transferred to a telemetry device, and thence up-hole to the surface, or are recorded in a memory device by logging tools to be used in a later time.

One type of telemetry method is electromagnetic (EM) telemetry, which uses a downhole EM transmitter to create very low frequency EM carrier waves in the formation adjacent to the well that are detected at the surface. In EM telemetry systems, the downhole carrier signal is produced by applying an alternating electric current across an electrically isolated (nonconductive) portion of the drill string. The required isolation is provided by a mechanically strong gap in a portion of drill string (called a 'gap sub') in order to maintain the torsional, bending etc. properties required for the drilling process. The EM signal originating across the gap is subsequently detected on the surface by, in general, measuring the induced electric potential difference between the drill rig and a grounding rod located in the earth some distance away.

Nonconductive materials forming the isolation section of the gap sub typically have inherently less strength and ductility than the conductive steel materials of the drill pipe, giving rise to complex designs that are necessary to complement the structural strength of gap within the drill pipe.

As described by several patent publications, many types of electrical isolation arrangements exist for the purpose of signal transmission in a drill string. Although these systems electrically isolate and seal while being subjected to drilling loads, they generally do so with a complicated multi-component design that thus becomes a relatively expensive device. Examples of such complicated and expensive designs are disclosed in U.S. Pat. Nos. 6,158,532 and 6,050,353 assigned to Ryan Energy Technologies, Inc. (Calgary, Calif.) whereby many separate components of the assembly are shown to be necessary in order to resist axial, bending and torsion forces.

It is also common knowledge in the oil and gas industry that a two-part epoxy-filled gap between coarse threads can be used to resist both axial and bending loads. Reverse torsion, which would tend to uncouple the joint, can be resisted by the insertion of dielectric pins into carefully fashioned slots. Since epoxy does not adequately seal against drilling pressures of typically 20,000 psi, additional components must be included to provide an elastomeric seal, again leading to mechanical complexity and added cost.

SUMMARY OF THE INVENTION

According to one aspect of the invention, there is provided a drill bit assembly comprising: (a) an electrically conductive bit head having a cutting end and an opposite connecting end with an engagement section; and (b) an electrically conductive pin body having a tubular body with an axial bore therethrough, and comprising a connecting end with an engagement section. The pin body connecting end is positioned relative to the bit head connecting end such that the engagement sections overlap and an annular gap is formed therebetween. The drill bit assembly also comprises an electrically insulating gap joint filling the annular gap between the bit head and pin body engagement sections such that the bit head and pin body are mechanically connected together at the connecting ends but electrically separated; and an electrical conductor extending across the gap joint and having one end electrically contacting one of the bit head and pin body, and the other end communicable with electronics equipment. The gap joint can be a dielectric thermoplastic material, such as a material comprising a liquid crystal polymer resin reinforced by glass fiber. Alternatively or additionally, an electrically insulating gap joint can be provided in another part of the drill bit assembly, and particularly, between two electrically conducting pieces of the drill bit assembly. For example, the pin body may comprise two pieces mechanically connected together but electrically separated by a gap joint.

An electronics housing can be provided in at least one of the bit head and pin body, and has a communications port for the conductor to extend therethrough and communicate with electronics equipment in the electronics housing. The electronics equipment can include electromagnetic telemetry circuitry. The electronics equipment can also include resistivity measurement circuitry for determining an alternating current conducted into the bit head and which induces an electric current in a reservoir formation adjacent the drill bit assembly; the current is inversely proportional to the resistivity of the reservoir formation. The electronics equipment can further include a switch electrically coupled to the conductor and switchable between the electromagnetic telemetry circuitry and the measurement circuitry wherein the conductor serves to conduct the alternating current to the bit head.

The electronics housing can be in the pin body and the conductor can comprise a transmission wire electrically connected to the electronics equipment, a feed-through in the communications port and electrically connected to the transmission wire, and a wire electrically connected to the feed-through, extending across the gap joint and electrically connected to the bit head.

A bit head communications port can be provided in the bit head which is aligned with the communications port in the pin body. The wire extends across the gap joint into the bit head communications port to electrically connect to the bit head.

The pin engagement section can be a male threaded section and the bit head engagement section can be a female threaded section; in such case, the pin body is connected to the bit head by inserting the pin body connecting end into the bit head connecting end and threading the male and female threaded sections together. The pin can further comprise an annular recess and a large root stress relief radius bridging the annular recess with the threaded section.

There can be at least one cavity in at least one of the bit head engagement section and the pin body engagement section. The gap joint can further comprise a segment protruding into each cavity to serve as an anti-rotation barrier. Both the bit head and pin body can comprise at least one cavity in each of their engagement surfaces, and the gap joint can comprise a segment protruding into each of the cavities, namely a first segment that protrudes into a first cavity in the bit head engagement section, and a second segment that protrudes into a second cavity in the pin body engagement section. The bit head and pin body engagement sections can be threaded with matching threads, and the dielectric thermoplastic material can be located between and around the matching threads. The cavity can be a groove extending substantially parallel to an axis of the bit head and pin body and across multiple threads of at least one of the bit head and pin engagement sections.

According to another aspect of the invention there is provided a borehole assembly comprising the drill bit assembly described above and a sub having an electronics housing as well as electronics equipment in the electronics housing communicative with the conductor. The electronics equipment includes electromagnetic telemetry circuitry. The sub can be a tool sub adjacent the drill bit assembly. Alternatively, the sub can be a mud motor and bent sub, and the electronics housing can be a bit box of the mud motor and bent box. Or, the sub can be a rotary steerable system (RSS) sub and the electronics housing can be located in at least one of an annular body of the RSS sub, an annular chassis of the RSS sub, and a mandrel cartridge of the RSS sub.

The borehole assembly can be manufactured by coupling a drill bit assembly manufactured in the manner described above to an electronics equipment sub directly or indirectly via a connecting sub to the drill bit assembly, and connecting the conductor of the drill bit assembly to electronics equipment in the electronics equipment sub.

According to another aspect of the invention, there is provided a method of manufacturing a drill bit assembly having a bit head with a cutting end and an opposite connecting end with an engagement section; and a pin body having a tubular body with an axial bore therethrough and comprising a connecting end with an engagement section. The method comprises: (a) aligning the pin body connecting end with the bit head connecting end such that the engagement sections overlap with a gap therebetween; (b) extending an electrical conductor across the gap and contacting one end of the electrical conductor with one of the bit head and pin body, and providing the other end of the electrical conductor to communicate with electronics equipment; and (c) injecting a liquid electrically insulating material into the gap and filling the gap, then solidifying the electrically insulating material such that an electrically insulating gap joint is formed and the bit head and pin are mechanically connected together at the connecting ends but electrically separated.

The other end of the conductor can be extended through a communications port and into an electronics housing of the drill bit assembly and the conductor can be connected to electronics equipment in the electronics housing. More particularly, the conductor can be connected to a switch of the electronics equipment; the switch is in switchable contact between electromagnetic telemetry circuitry and measurement circuitry of the electronics equipment.

The electronics housing and the communications port can be in the pin body and the bit head can also comprise a communications port. In which case, the method can further comprise aligning the pin body communications port with the bit head communications port, and extending the conductor across the gap and into the bit head communications port to connect with the bit head and into the pin body communications port to connect with the electronics equipment.

The method can further comprise forming an anti-rotation barrier by injecting the liquid electrically insulating material into the gap and into at least one cavity in at least one of the bit head engagement section and the pin body engagement section, and solidifying the electrically insulating material such that a segment of electrically insulating material protrudes into the cavity.

According to another aspect of the invention, there is provided a drill bit assembly comprising: a bit head having a cutting end and an opposite connecting end with an engagement section; and a pin body having a tubular body with an axial bore therethrough, and comprising a connecting end with an engagement section. The pin body connecting end is connected to the bit head connecting end such that the engagement sections overlap. At least one of the bit head and pin body comprises two mating pieces each with a mating end positioned relative to each other that an annular gap is formed therebetween.

An electrically insulating gap joint fills the annular gap between the two pieces of the bit head or pin body or both such that the mating pieces are mechanically connected together at the mating ends but electrically separated. An electrical conductor extends across the gap joint and has one end electrically contacting one of the mating pieces of the bit head or pin body or both, and the other end is communicable with electronics equipment.

According to another aspect of the invention, there is provided a method of manufacturing a drill bit assembly having a bit head and a pin body wherein at least one of the bit head and pin body has two mating pieces connected together by a gap joint. The bit head has a cutting end and an opposite connecting end with an engagement section; and the pin body has a tubular body with an axial bore therethrough and comprises a connecting end with an engagement section. At least one of the bit head and pin body comprises two mating pieces each having a mating end. The method comprises: (a) positioning the engagement sections of the pin body and the bit head such that the pin body and the bit head are connected at their connecting ends; (b) positioning the mating ends of the two mating pieces of the pin body or the bit head or both such that a gap is formed between the mating ends; (c) extending an electrical conductor across the gap and contacting one end of the electrical conductor with one of the mating pieces, and providing the other end of the electrical conductor to communicate with electronics equipment; and (d) injecting a liquid electrically insulating material into the gap and filling the gap and solidifying the electrically insulating material such that an electrically insulating gap joint is formed and the two mating pieces of the bit head or pin body or both are mechanically connected together at the connecting ends but electrically separated.

BRIEF DESCRIPTION OF THE DRAWINGS

FIGS. 6(a) and (b) are schematic exterior and sectional elevations views of the drill bit assembly having an annular pin body with an electronics housing in the body according to a second embodiment.

DETAILED DESCRIPTION OF EMBODIMENTS OF THE INVENTION

Drill String

Figure 1:
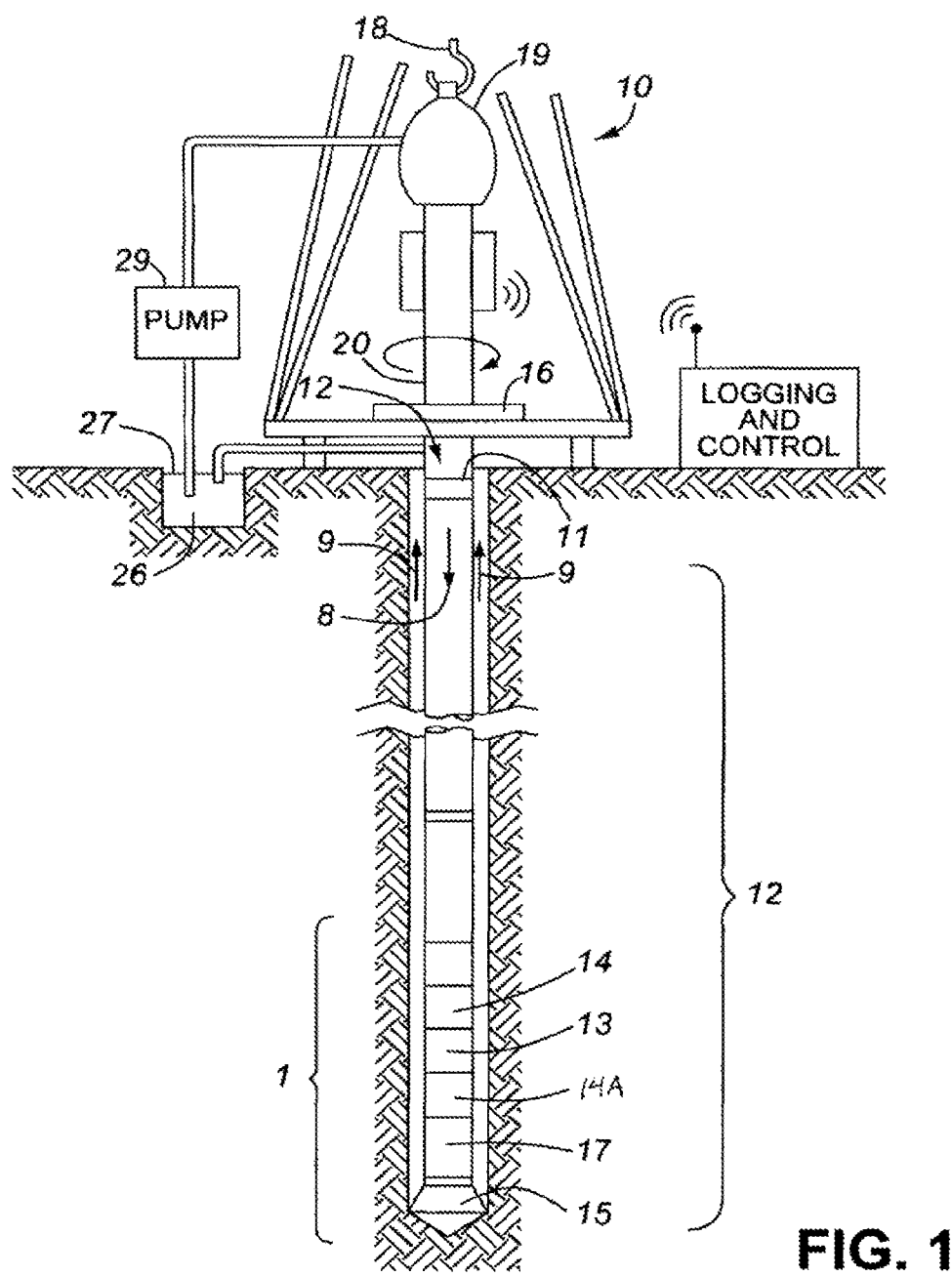
FIG. 1 is a schematic of a drill bit assembly attached to other components in a drill string according to one embodiment of the invention, in use in a well site.
Figure 2:
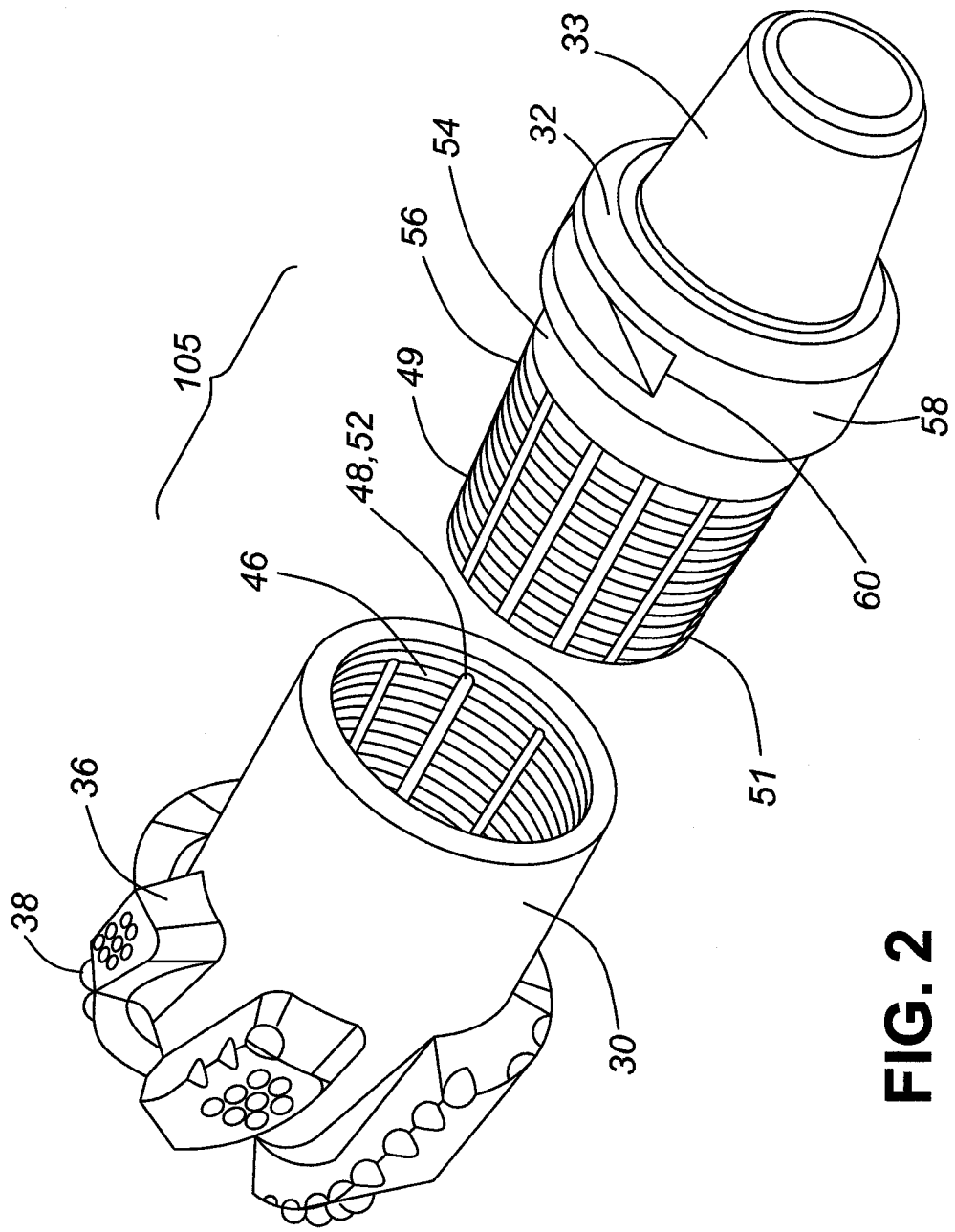
FIG. 2 is a perspective view of a bit head and a double pin body of the drill bit assembly in disassembled form.
Figure 3:
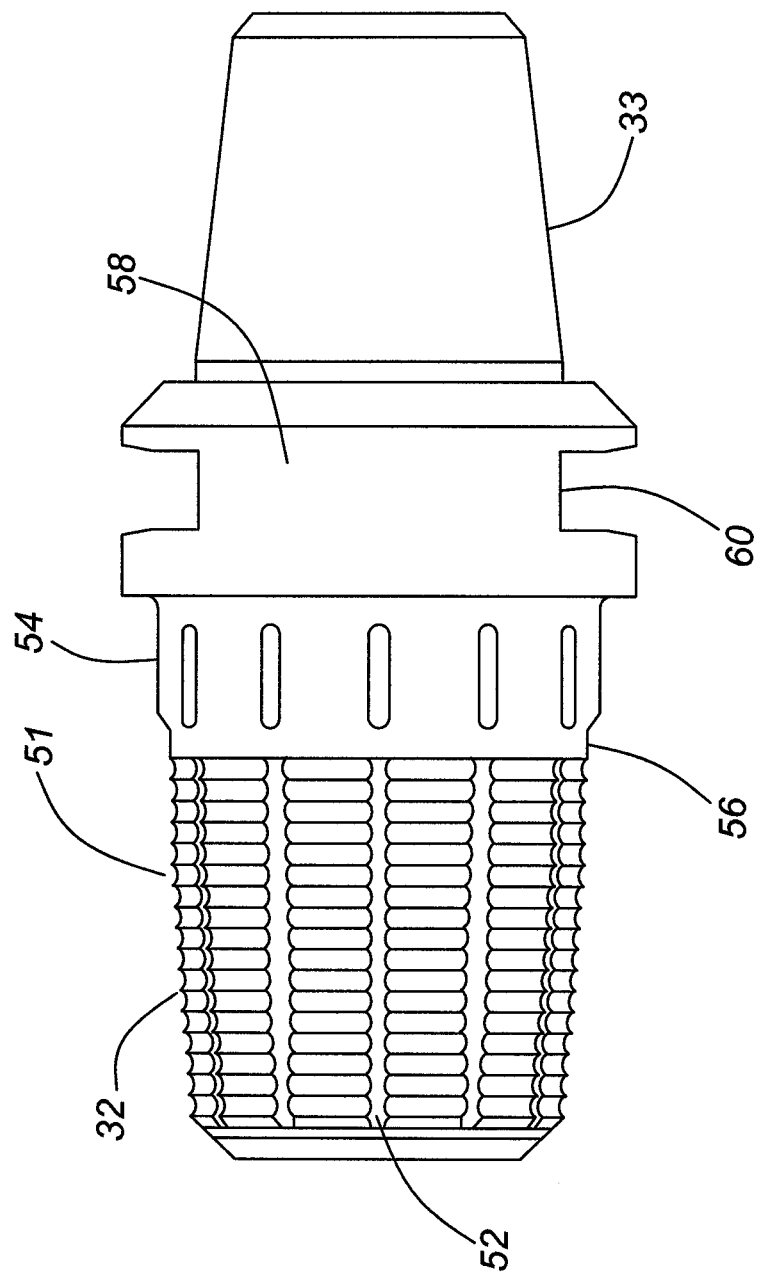
FIG. 3 is a side elevation view of the double pin body.

FIG. 1 illustrates a wellsite system in which a drill string 12 having a drill bit assembly 15 according to one embodiment of the invention can be employed. The wellsite can be onshore or offshore. This exemplary system depicts a vertical well but the invention is also applicable for horizontal well drilling. In FIG. 1 a borehole 11 is formed in subsurface formations by rotary drilling in a manner that is well known. Embodiments of the invention can also use directional drilling, as will be described hereinafter.

The drill string 12 is suspended within the borehole 11 and has a bottom hole assembly 1 which includes the drill bit assembly 15 at its lower end. The bottom hole assembly 1 of the illustrated embodiment comprises a measuring-while-drilling (MWD) module 13, a logging-while-drilling (LWD) module 14, a drill bit assembly 15, and a roto-steerable system and motor 17. The surface system includes platform and derrick assembly 10 positioned over the borehole 11, the assembly 10 including a rotary table 16, kelly 20, hook 18 and rotary swivel 19. The drill string 12 is rotated by the rotary table 16, energized by means not shown, which engages the kelly 20 at the upper end of the drill string. The drill string 12 is suspended from a hook 18, attached to a traveling block (also not shown), through the kelly 20 and a rotary swivel 19 which permits rotation of the drill string 12 relative to the hook 18. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit assembly 15, and then circulates upwardly through the annulus region between the outside of the drill string and the wall of the borehole, as indicated by the directional arrows 9. In this well known manner, the drilling fluid lubricates the drill bit assembly 15 and carries formation cuttings up to the surface as it is returned to the pit 27 for recirculation.

The bottom hole assembly (BHA) 1 of the illustrated embodiment comprises a logging-while-drilling (LWD) module 14, a measuring-while-drilling (MWD) module 13, a roto-steerable system and motor 17, and the drill bit assembly 15.

The LWD module 14 is housed in a special type of drill collar, as is known in the art, and can contain one or a plurality of known types of logging tools. It will also be understood that more than one LWD and/or MWD module can be employed, e.g. as represented at 14A. (References, throughout, to a module at the position of 14 can alternatively mean a module at the position of 14A as well.) The LWD module may include capabilities for measuring, processing, and storing information, as well as for communicating with the surface equipment. In the present embodiment, the LWD module includes a pressure measuring device.

The MWD module 13 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module may include one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling". In this embodiment, a roto-steerable subsystem 17 (FIG. 1) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of a planned drilling trajectory because of the unpredictable nature of the formations being penetrated or the varying forces that the drill bit experiences. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut side ways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; 5,971,085 all herein incorporated by reference.

Drill Bit Assembly

In each of the embodiments described and shown in FIGS. 1 to 25, the drill bit assembly 15 has a bit head 30 and a mating double pin body 32 with a thermoplastic electrically isolating gap joint 34 having anti-rotation barriers 40 (see FIG. 19) in between the mating portions of the bit head 30 and the double pin body 32. The gap joint 34 has electrically insulating properties and electrically separates the bit head and pin body, which are both electrically conductive. The gap joint 34 is also impermeable to fluid and maintains its electrical resistance under high hydrostatic pressures, thereby preventing conductive fluid from shorting across the small thread gap between the pin body and bit head 32, 30. In some embodiments, an electronics housing is provided in the pin body or in the bit head. The electronics housing houses electronics equipment comprising reservoir formation measurement equipment and an electromagnetic (EM) transceiver equipment which use a conductor that extends from the electronics housing across the gap joint 34 to contact a conductive part of the drill bit assembly 15 on the other side of the gap joint 34. In the embodiment shown in FIG. 26, another component of the bottom hole assembly 1 has an insulated gap joint that is used for EM telemetry. In the embodiment shown in FIG. 27, the pin body has two pieces and a gap joint is located between these two pieces to mechanically connect but electrically separate the two pieces. This gap joint can be provided in additional to or alternatively to the gap joint 34 between the bit head 30 and pin body 32.

The anti-rotation barriers 40 provided by the gap joint 34 eliminate the need for a separate circumferential weld between the bit head 30 and the pin body 32, or between the pin body 32 and a locking ring (not shown) locked to the bit head 30 as found in some types of bit heads. Also, the gap joint 34 provides a seal between the pin body 32 and bit head 30 and keeps higher internal (bore) pressure from escaping to the lower pressure exterior (annulus) in the drill bit assembly 15.

A first embodiment of the drill bit assembly 15 is shown in detail in FIGS. 2 to 6. The bit head 30 in this embodiment is a matrix head with a crown with a cutting end and a tubular portion terminating at an opposite pin engagement end. A female threaded axial bore 35 (see FIG. 4) extends from the pin engagement end part way into the body of the bit head 30. The axial bore 35 has an annular lip part way between the end of the bore and the pin engagement end, which abuts against the rim of a gap joint end of the double pin body 32. The bit head 30 has a one piece body made of tungsten carbide in a manner that is well known in the art. Alternatively, the bit head can include a steel locking ring which mechanically engages the bit head with keys that extend into matching keyholes in the bit head (not shown). The locking ring can then be welded to the pin body. An example of such a drill bit assembly having a locking ring are those manufactured by Lyng Drilling. In yet another alternative, the bit head 30 can have a two piece body comprising a tungsten carbide crown brazed onto a steel tubular body with a female threaded axial bore (not shown).

The cutting end of the bit head 30 has a plurality of blades 36. Attached to each blade 36 are a plurality of cutting elements 38; suitable cutting elements include those made from polycrystalline diamond compact (PDC), cubic boron nitride, or other super hard materials as is known in the art. The bit head 30 also has a plurality of drilling fluid discharge ports 42 which extend from the end of the axial bore 35 to the exterior surface of the cutting end of the bit head 30. The axial bore 35 has a portion which tapers inwards and has female threads 46, ("female threaded section"). A plurality of parallel slots or grooves 48 extend in an axial direction through the threads 46 and serve to form anti-rotation barriers as will be described in more detail below. The grooves 48 are milled into the threads 46 and are spaced around the circumference of the threaded section.

While a matrix head is shown as the bit head 30 in this embodiment, other types of bit heads can be substituted, such as a tri-cone bit head (not shown).

The double pin body 32 is made of a 4130 high strength steel alloy but can alternatively be made of any suitable material as known in the art. The double pin body 32 has a generally tubular body with two connecting pin ends each tapering inwards, namely: a gap joint pin end 49 for engagement with the bit head 30, and an API pin end 33 for engagement with the rest of the bottom hole assembly 1. The gap joint pin end 49 has a rim which abuts against the annular lip of the bit head axial bore 35. An axial bore 50 extends through the pin body 32 to allow drilling fluid to flow therethrough and to the ports 42 of the bit head 30. The gap joint pin end 49 has a tapered and rounded coarse male threaded section with threads 51 that match the female threads 46 of the bit head 30. A plurality of parallel slots or grooves 52 extend in an axial direction through the threads 51 and serve to form the thermoplastic anti-rotation barriers 40 (not shown in FIGS. 2 to 6 but shown in FIG. 19). The grooves 52 are milled into the threads 51 and are spaced around the circumference of the threaded section. The male threaded section extends from the gap joint pin end to an annular recess 54; an annular, large root stress relief radius 56 bridges the annular recess 54 and threaded section and serves to reduce stress concentrations between the mating components and the thermoplastic gap joint 34 and allows for more even flow of the thermoplastic during injection, as will be described in further detail below. The annular recess abuts against a rim 58, which serves to contain the thermoplastic material 34 in the recess and contain a bit breaker slot 60.

The elongated grooves 48, 52 are machined into the male and female threads 46, 51 and provide cavities for thermoplastic material to fill and form the anti-rotation barriers 40. As will be described in more detail below, anti-rotation, i.e. torsion resistance, is provided by means which require parts of the thermoplastic anti-rotation barrier 40 to shear in order to disassemble the pin body 32 and bit head 30 under torsion loading. The grooves 48, 52 can be but do not have to be aligned when the bit head 30 and pin body 32 are connected.

Housing Electronics in Drill Bit Assembly

Figure 4:
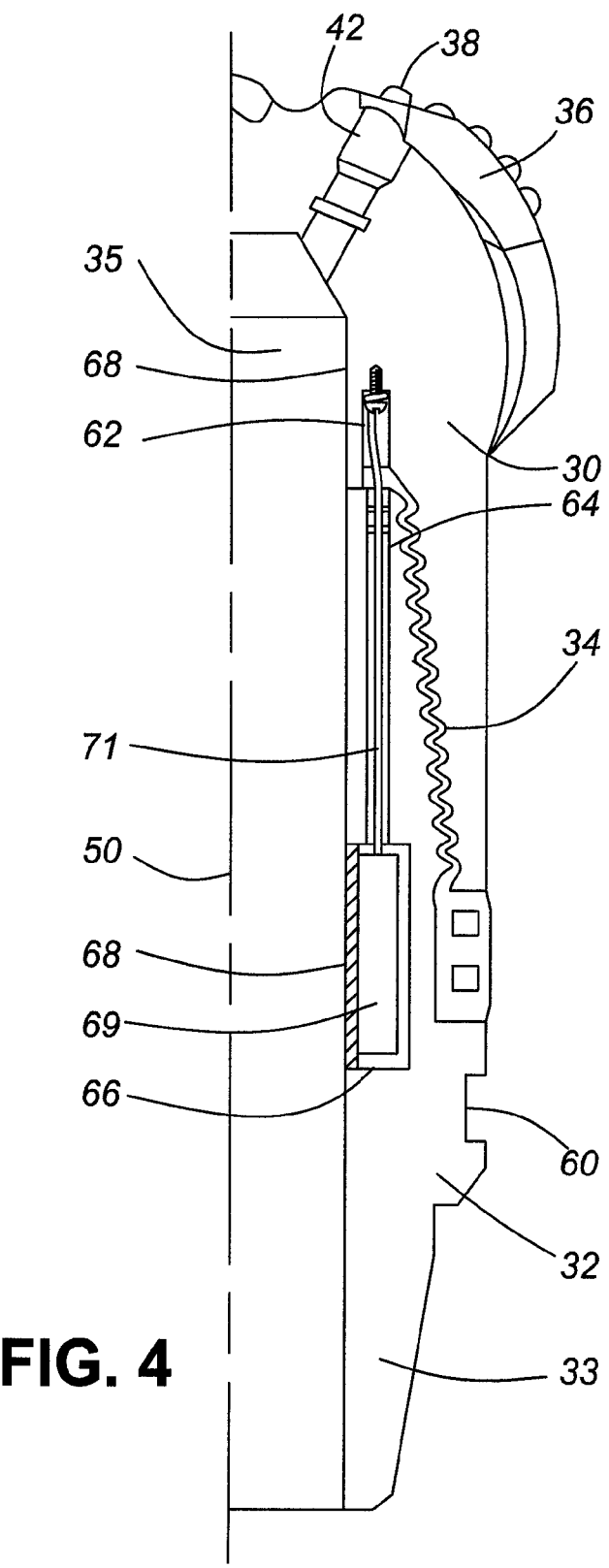
FIG. 4 is a cross-sectional half view of the drill bit assembly with the bit head and double pin body in threaded connection with an electrical isolator gap joint having an anti-rotation barrier in between threads of the bit head and pin.
Figure 5:
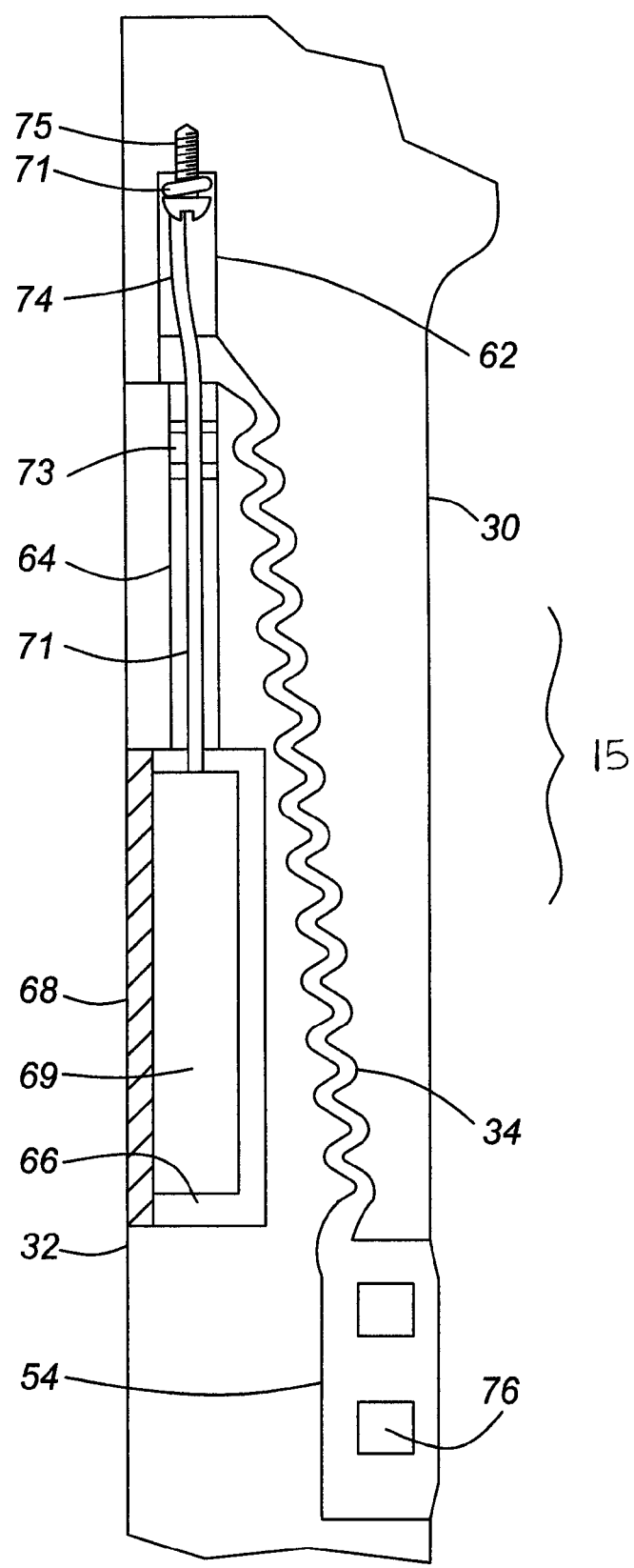
FIG. 5 is a cross-sectional detail view of EM telemetry equipment located in the bit head with a conductor extending through the electrical isolator gap joint into the pin.

Referring to FIGS. 4 and 5, the drill bit assembly 15 can be provided with a feature such as a communications port 62 in the bit head 30 which connects to or is communicative with a feature such as a communications port 64 in the pin body 32. The pin body communications port 64 is located in the annular portion of the pin body 32, and has one end in communication with an annular electronics housing 66 and another end in communication with the rim of the gap joint pin end, i.e. faces the pin engagement end of the bit head 30. The electronic housing 66 is accessed by a cover 68 in the axial bore 50 of pin body 32. The bit head communications port 62 is a cavity with a mouth that opens into the annular lip of the axial bore 35 and faces the rim of the gap joint pin end.

Referring to FIG. 5, the electronics housing 66 contains batteries, sensors, microprocessor, and electronics sufficient to measure resistivity and other downhole parameters (collectively, "electronics equipment 69"). The electronics equipment 69 includes an EM transceiver which comprises a transmitter that produces an EM transmission signal consisting of an alternating voltage or a frequency or phase modulated alternating current applied to a conductor end of a transmission wire 71 having a conductive jacket, and a receiver for receiving an EM telemetry signal from the MWD module 13.

The transmission wire 71 extends through the pin body communications port 64 and is potted to support it against vibration damage. One end of the transmission wire 71 is electrically connected, through the use of solder, crimp, or similar technique, to one end of a feed-through conductor of a feed-through 73. The feed-through 73 is seated in the mouth of the pin body communications port 64 that opens into the gap between the pin body 32 and bit head 30. A feed-through is a well known and commercially available part from a supplier such as Greene Tweed, Inc. and consists of an insulating body, seals surrounding the body and providing a seal between the body and the pin body communications port 64, and the conductor seated within a bore in the body. The purpose of the feed-through 73 is to provide a means of passing an electrical conductor through a sealed insulator.

The bit head and pin body communications ports 62, 64 must be precisely aligned with each other in order to allow the passing of wiring therethrough. In particular, wiring 74 is electrically coupled at one end to a second end of the feed-through 73 in a similar manner to the transmission wire 71 and extends through the gap joint 34 and into the bit head communications port 62. The other end of the wiring 74 extends inside the bit head communications port 62 and is anchored to and makes electrical contact solely with the bit head 30 through the use of a securing bolt 75 threaded into the body of the bit head 30.

Alternatively but not shown, an electronics equipment housing can be provided in the bit head 30 instead of or in addition to the pin body 30 in which case the feed through 73 is located in the bit head communications port 62 and the wiring 74 extends from the feed through across the gap joint 34 and into the pin body communications port 64 wherein it is secured to the pin body 32 by a securing bolt.

The bit head and pin body communications ports 62, 64 are aligned with each other by using an assembly method that does not require a conventional application of torque by a make-up machine, and instead involves fixing the pin body 32 and bit head 30 at a selected alignment to each other using an injection molding machine (not shown), then injecting a high-strength, non-porous thermoplastic material 34 at a high temperature in between the mating portions of the pin body 32 and bit head 30 and allowing the thermoplastic material 34 to set under pressure, thereby fixing the pin body 32 and bit head 30 relative to each other in the aligned position.

The thermoplastic material 34 is injected under high pressure into the interstitial space between the equidistant male and female threads of the pin and bit head threaded sections. The injected thermoplastic fills the barrier forming grooves 48, 52 in the pin and bit head 30, 32 to form the anti-rotation barriers 40, and between the conductive component threads to electrically isolate the conductive pin body 32 and bit head 30 from each other. Many different suitable thermoplastic materials may be chosen depending on the properties required. In this embodiment, a particularly suitable thermoplastic material is a resin/fiber composition comprising a liquid crystal polymer (LCP) resin sold under the trade-name Zenite 7130 by DuPont. This material offers high toughness, stiffness, chemical resistance, and creep resistance at high temperature. The resin is further reinforced by the addition of 30% glass fiber. This thermoplastic material 34 is especially suitable as it has low mould shrinkage and low viscosity, especially under high processing stresses. The low viscosity allows the thermoplastic to fill close fitting serpentine paths, such as that formed by overlapping threads. The low shrinkage prevents the thermoplastic from shrinking too much during cooling and creating a poor seal. The thermoplastic is also has dielectric properties, i.e. has negligible electrical conductivity. In another embodiment of the invention rods of insulating material such as fiberglass or Zenite can be inserted in the grooves formed by barrier forming grooves 48, 52 before injecting the thermoplastic. These may serve as centralizers keeping bores 35, and 50 symmetric relative to each other.

Connecting the bit head 30 to the pin body 32 such that the communication ports 62, 64 in each respective component are precisely aligned will now be described.

First, the electronics equipment 69 is installed into the housing 66 and the transmission wire 71 is connected to the feed-through 73. Then, wiring 74 is connected to the feed-through 73 so that the wiring extends out of the mouth of the pin body communications port 64. Then, the drill bit assembly 15 is assembled by loosely screwing the threaded ends of the bit head and pin body 30, 32 together in an axially symmetric arrangement on a mandrel (not shown) which extends through the bores 35, 50 of the pin body and bit head so that the ports 62, 64 in the bit head 30 and pin body 32 are precisely aligned. The mandrel also secures the pin body 32 and bit head 30 in place with a gap between the engagement sections of these two parts, and also serves to prevent thermoplastic material from spilling into the bores 35, 50. The wiring 74 is threaded into the bit head communications port 62 and fastened to the securing bolt 75, which is then screwed into a drill hole in the bit head communications port 62. The transmission wire 71, feed-through 73 and wiring 74 form one continuously extending electrical conductor and serves as the conductor for the EM telemetry equipment; this conductor can also serve to conduct current for measurement equipment taking resistivity measurements as will be discussed below.

Alternatively, the wiring 74 can be first secured to the securing bolt 75, then connected to the feed through 73. As another alternative, the feed-through 73, wiring 74, and transmission wire 71 is replaced by a single continuous conductor which extends from the securing bolt 75 to the electronics equipment 69.

Then, the threaded connecting ends of the bit head and pin 30, 32 are fixed in a mold of an injection molding machine (not shown) such that the tapered threads overlap but do not touch and the bit head and pin body communications ports 62, 64 remain precisely aligned. Such injection molding machine and its use to inject thermoplastic material into a mold is well known the art and thus are not described in detail here. The mold is designed to accommodate the dimensions of the loosely screwed together drill bit assembly 15 in a manner that the thermoplastic injected by the injection molding machine is constrained to fill the gaps in between the threads. Optionally, the assembly 15 can be evacuated first before injecting the thermoplastic.

Then, the thermoplastic material is heated to between 363° C. and 371° C. and preferably about 370° C. until the thermoplastic is in liquid form, and then is injected ("injectant") into an equidistant gap formed between the threads of the bit head and pin body 30, 32 until the bores 35, 50 are physically separated by thermoplastic material, into the barrier forming grooves 48, 52 and into the annular recess 54 circumscribing the pin body 32 up to but not spilling over edge of the rim 58. During this process, the thermoplastic material will cover the wiring 74, which is exposed between the communication ports 62, 64. Wear rings 76 surrounding the recess 54 can be embedded in the thermoplastic material to protect the seal against wear. The mold temperature, thermoplastic temperature, flow rate, and pressure required to beneficially flow the injectant and completely fill these spaces are selected in the manner as known in the art. The mold and bit head 30 and pin body 32 are also heated, to about 150° C. so that these parts do not cause the thermoplastics to cool too quickly and solidify prematurely and not completely fill the gap. Once filled, a holding pressure (typically ~16,000 psi) is maintained until the thermoplastic injectant cools and solidifies and the thermoplastic gap joint 34 with sealing anti-rotation barriers 40 is formed.

The pin body 32 and bit head 30 can be provided with elongated grooves through the threads (not shown). The thermoplastic material will fill these grooves and form anti-rotation barriers protruding from the gap joint, and impeding the pin body 32 from rotating relative to the bit head 30.

After the thermoplastic material solidifies and become mechanically rigid or set, formation of the thermoplastic gap joint 34 with sealing and anti-rotation barriers 40 is complete and the bit head 30 and pin body 32 can be removed from the injection molding machine. The thermoplastic gap joint 34 now firmly holds the bit head 30 and pin body 32 together mechanically, yet separates the bit head 30 and pin body 32 electrically. The thermoplastic gap joint 34 also provides an effective drilling fluid barrier between the inside and outside of the drill bit assembly 15. Also, this injection process enables the bit head and pin body communication ports 62, 64 in the bit head 30 and pin body 32 to be precisely aligned, which cannot be done by a make-up machine.

The thermoplastic gap joint 34 is generally annular, having an annular outer rim which fills the recess 54, an annular inner rim which separates the axial bores 35, 50 of the bit head 30 and pin body 32, and an annular undulating interconnect portion interconnecting the outer and inner rims. The outer and inner end rims are respectively exposed on the outer and inner surfaces of the drill bit assembly 15 with sufficient distance between the bit head and pin 30, 32 to provide the electrical isolation necessary for the drill bit assembly to serve as an EM telemetry emitter for example.

By using an electrically insulated gap integral to the drill bit, resistivity and other measurements can be taken at the drill bit location rather than at a greater distance back in the LWD module of the bottom hole assembly 1. This is particularly advantageous as there would be an immediate indication of formation penetration since all water-bearing rock formations conduct some electricity (lower measured resistivity), and hydrocarbon-bearing rock formation conduct very little electricity (higher measured resistivity). Greater accuracy can be achieved by knowing the formation resistivity at the face; this ensures that proper corrective responses can be taken to maintain borehole placement in the pay-zone while directional drilling. Further, real-time data can be provided allowing for quicker drilling as the lag-time typically experienced in determining formation penetration would be reduced.

By providing the electrically insulating gap joint 34 in the drill bit assembly 15, it may not be necessary to use a secondary telemetry tool in the drill string 12 such as the MWD module 13, as the gap joint 34 combined with the appropriate electronics equipment and power supply 69 could be used for EM telemetry with the surface. In doing so, the length of the drill string 12 can be shortened as the functionality provided by the MWD module 13 is provided in the drill bit assembly 15. Conversely, the gap joint 34 could be used as a means of communication between one or more telemetry device(s) further up the drill string 12 (a short hop) such as the MWD module 13, acting as a relay for data gathered at the face (all the measuring devices located below the motor for example).

In an alternative embodiment as shown in FIGS. 6(*a*) and (*b*), the gap joint pin end of the pin body 32 abuts directly against the end of the axial bore 35 of the bit head 30, and the securing bolt 75 does not have to be recessed in the bit head communications port 62 and instead is secured to the end the bit head axial bore 35 (or to the annular rim of the axial bore 35 as shown in FIGS. 2 to 5). While the securing bolt 75 is more exposed, this alternative embodiment eliminates the need to precisely align the bit head and pin body communications ports 62, 64; after the pin body 32 and bit head 30 are fastened in the injection molding machine, a drill can be inserted into the electronics housing 66 and though pin body port 64 and a drill hole can be drilled into the annular lip of the axial bore 35. Then, the bolt 75 can be secured through this drill hole.

The embodiment shown in FIGS. 6(*a*) and (*b*) also differs in having the electronics housing 66 located beyond the threads 46 such that the housing 66 opens into the exterior surface of the pin body 32 and the cover 68 is located on the pin body exterior surface. While this design may extend the length of the pin body 32, it makes for easier access to the electronics housing 66. Sensors (not shown) such as inclinometers, accelerometers, magnetometers, or temperature sensors can be mounted in the housing 66. External sensors, such as electrodes 127, can also be implemented in the drill bit assembly 15.

Housing Electronics in Another Sub in the Bottomhole Assembly

FIGS. 7 to 12 show an alternative embodiment, wherein the electronics equipment 69 are not housed in the pin body 32, but instead are housed in a separate adjacent tool sub 88 or in another component sub of the bottom hole assembly 1.

Figure 7A:
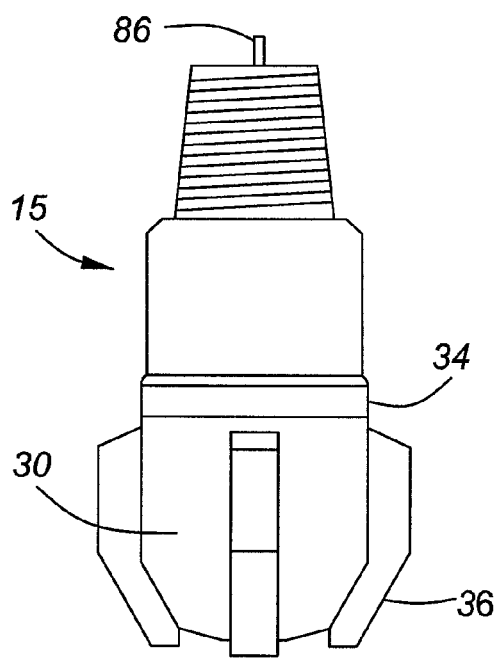
FIGS. 7(a) and (b) are schematic exterior and sectional elevations views of the drill bit assembly having a conductor extending through an axial bore of the drill bit assembly according to a third embodiment.
Figure 7B:
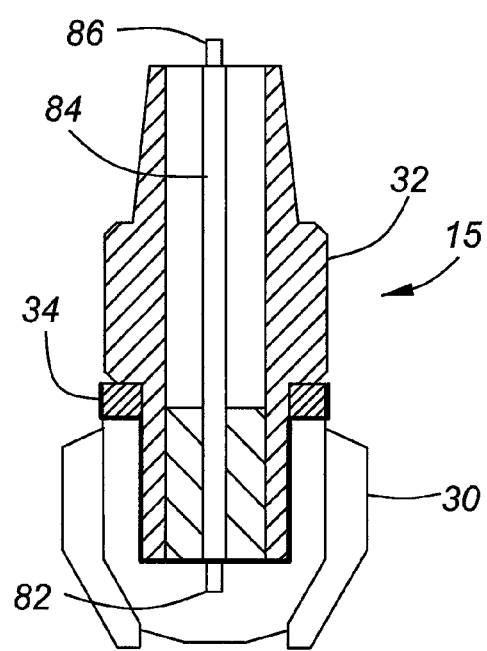

The assembled drill bit assembly 15 with an insulated gap join 34 is shown in FIGS. 7(*a*) and (*b*). An elongated insulated electrical conductor such as an electrically conductive metal rod 82 with an insulated covering 84 is attached to the bit head 30 on one end, and has an electrical connection on the other end 86. The rod 82 can simply be threaded into the body of the bit head 30, for example. Alternatively, the rod 82 can plug into an electrical connector mounted in the matrix body (not shown). The rod insulated covering 84 can be a ceramic coating or a sleeve (e.g. peek). It may be desirable to provide a centralizer for the insulated rod (not shown) which would serve to align the connecting end of rod 82 during make-up to the drill collar above the drill bit assembly 15.

Figure 8A:
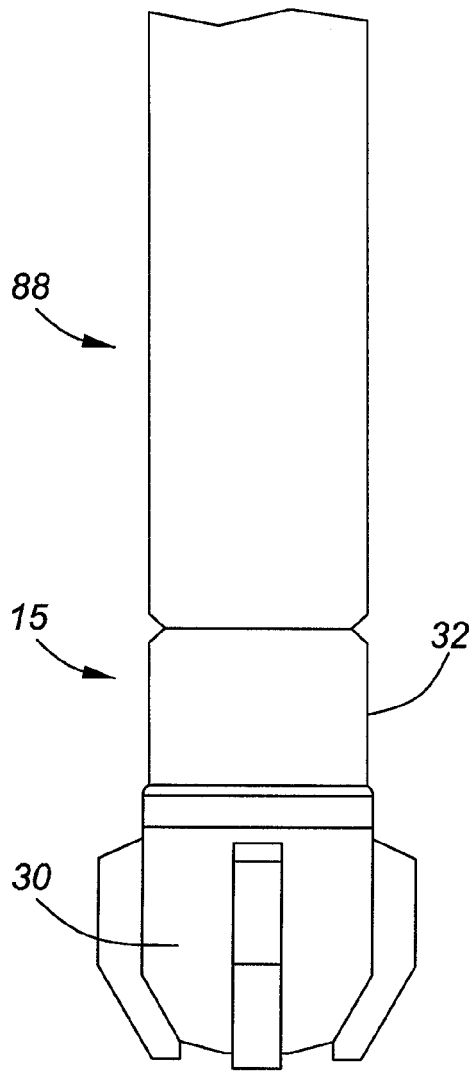
FIGS. 8(a) and (b) are schematic exterior and sectional elevations views of the drill bit assembly of the third embodiment connected to an electronics & power sub.
Figure 8B:
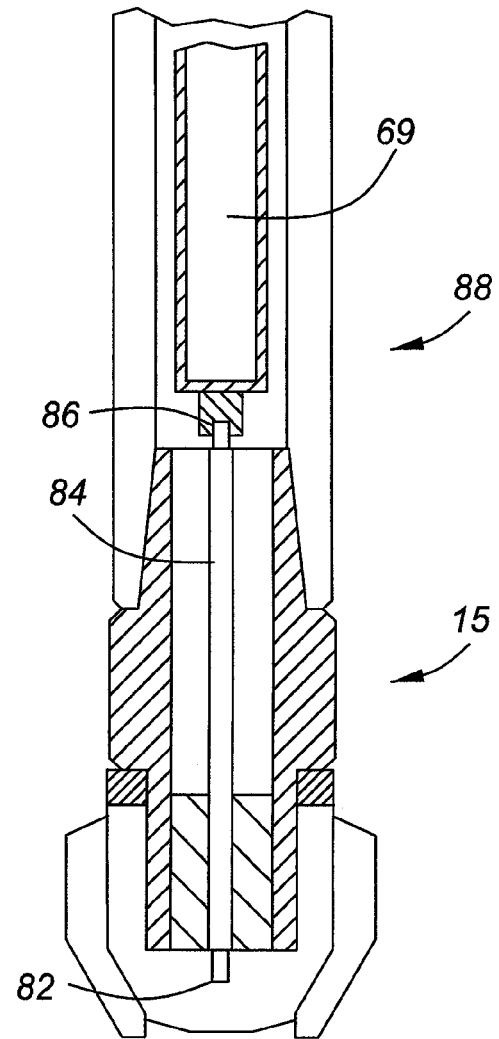

The rod 82 provides an electrical connection between the matrix body and a sub 88 run above the drill bit assembly 15 (see FIG. 8). This sub 88 could be a drill collar, a mud motor, or a rotary steerable system as known in the art. The sub 88 may contain electronics, power supply, and sensors (collectively the electronics equipment 69), and can take the form of several different embodiments, as will be described in detail below.

Drill bits are dispensable items, and usually last only a few days before they are no longer able to efficiently cut rock. If electronics equipment 69 are integrated into the drill bit assembly 15 as they are in the embodiments shown in FIGS. 2-6, then they might be recovered from a worn bit at a field location and re-used. However, the double pin body 32 with the insulating gap joint 34 might have to be recycled to a manufacturing facility for rework. Hence, it may be desirable to locate the electronics equipment in a separate sub and thus reduce the cost of the insulated bit assembly.

The embodiment shown in FIG. 8 locates the electronics equipment 69 in a separate tool sub 88 and uses the drill bit assembly 15 as shown in FIG. 7. Such a drill bit assembly 15 can be a simpler design than the drill bit assembly 15 shown in FIGS. 2 to 6 and should thus be simpler and less expensive to use and maintain. If the bottom hole assembly 1 does not include a steerable system 17, then a drill bit assembly 15 according to either embodiment can be run without much difficulty. However, if the steerable system 17 is used, then it becomes more difficult to implement the drill bit assembly 15 with a separate tool sub 88, as the separate tool sub 88 results in a significantly longer drill bit assembly 15 that may not be compatible with a directional drilling assembly that uses a positive displacement motor (PDM) and bent sub, or a rotary steerable system (RSS) 17, the electronics equipment 69 can be integrated into existing parts of the bottom hole assembly 1.

Figure 9:
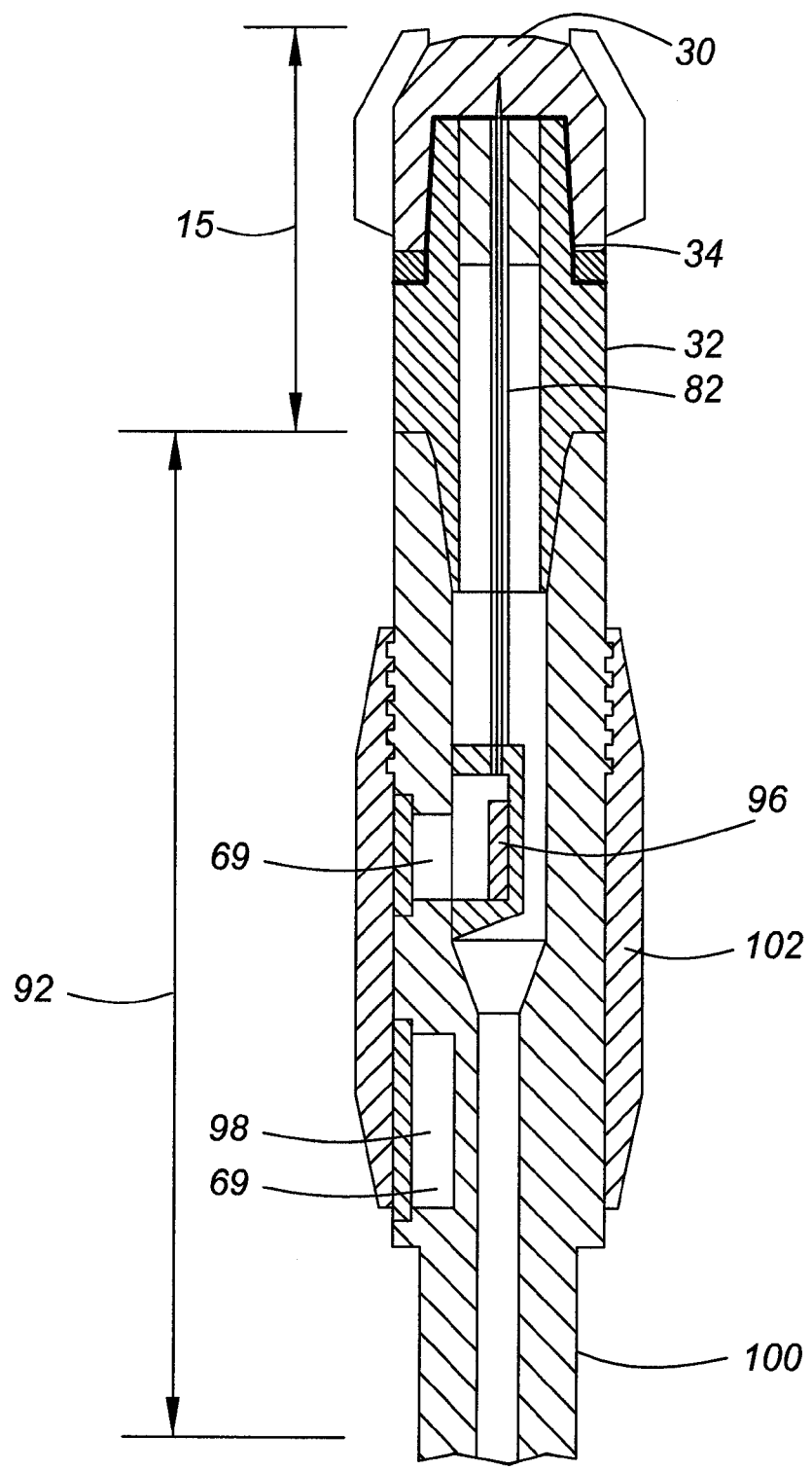
FIG. 9 is a schematic sectional view of the drill bit assembly of the third embodiment connected to a bent sub assembly.
Figures 10A, 10B:
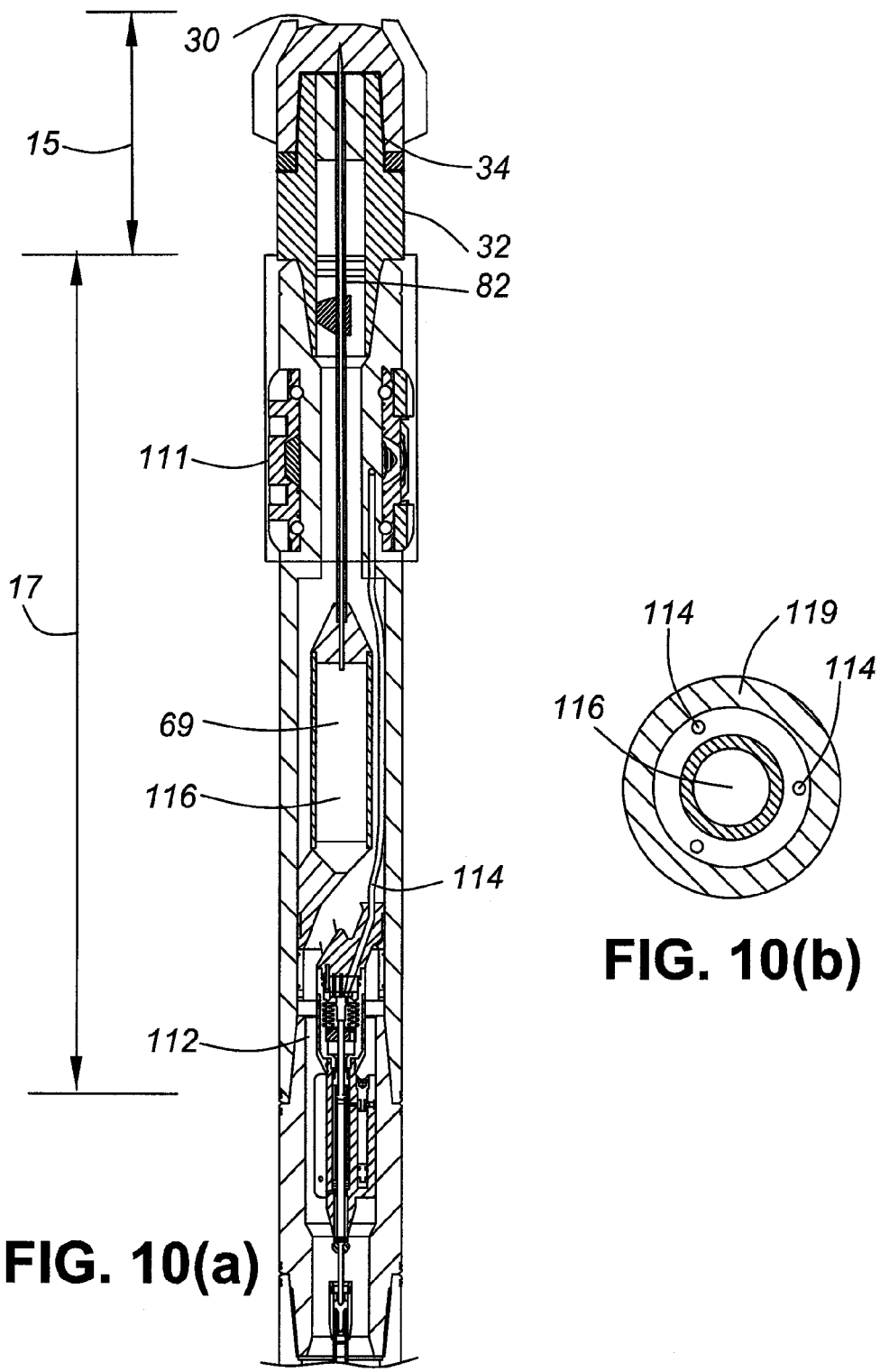
FIGS. 10(a) and (b) are schematic side and cross sectional views of the drill bit assembly of the third embodiment connected to a rotary steerable system (RSS) sub having electronics mounted in a mandrel of the sub.
Figures 11A, 11B:
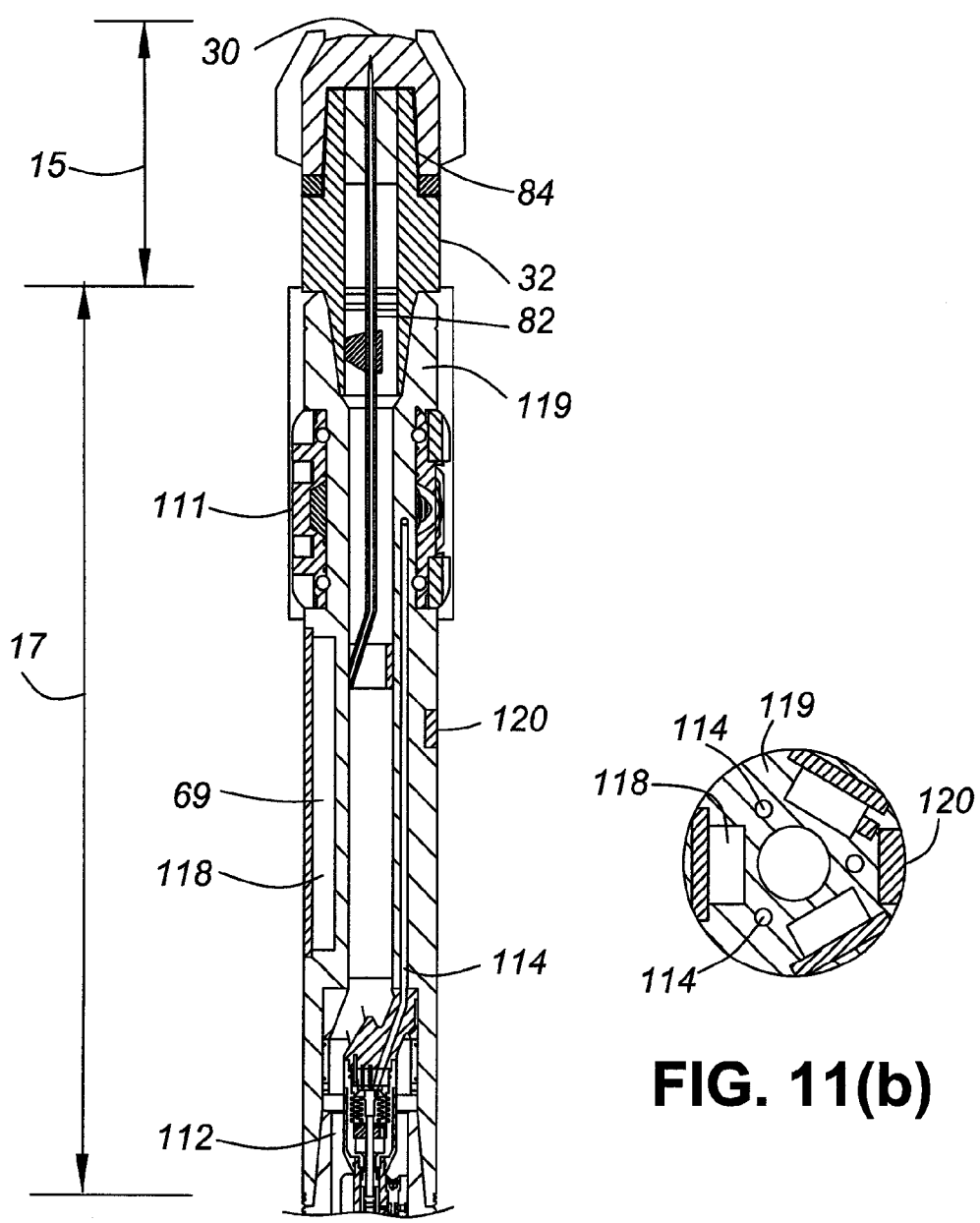
FIGS. 11(a) and (b) are schematic side and cross sectional views of the drill bit assembly of the third embodiment connected to a RSS sub having electronics mounted in a sidewall of the sub.
Figures 12A, 12B:
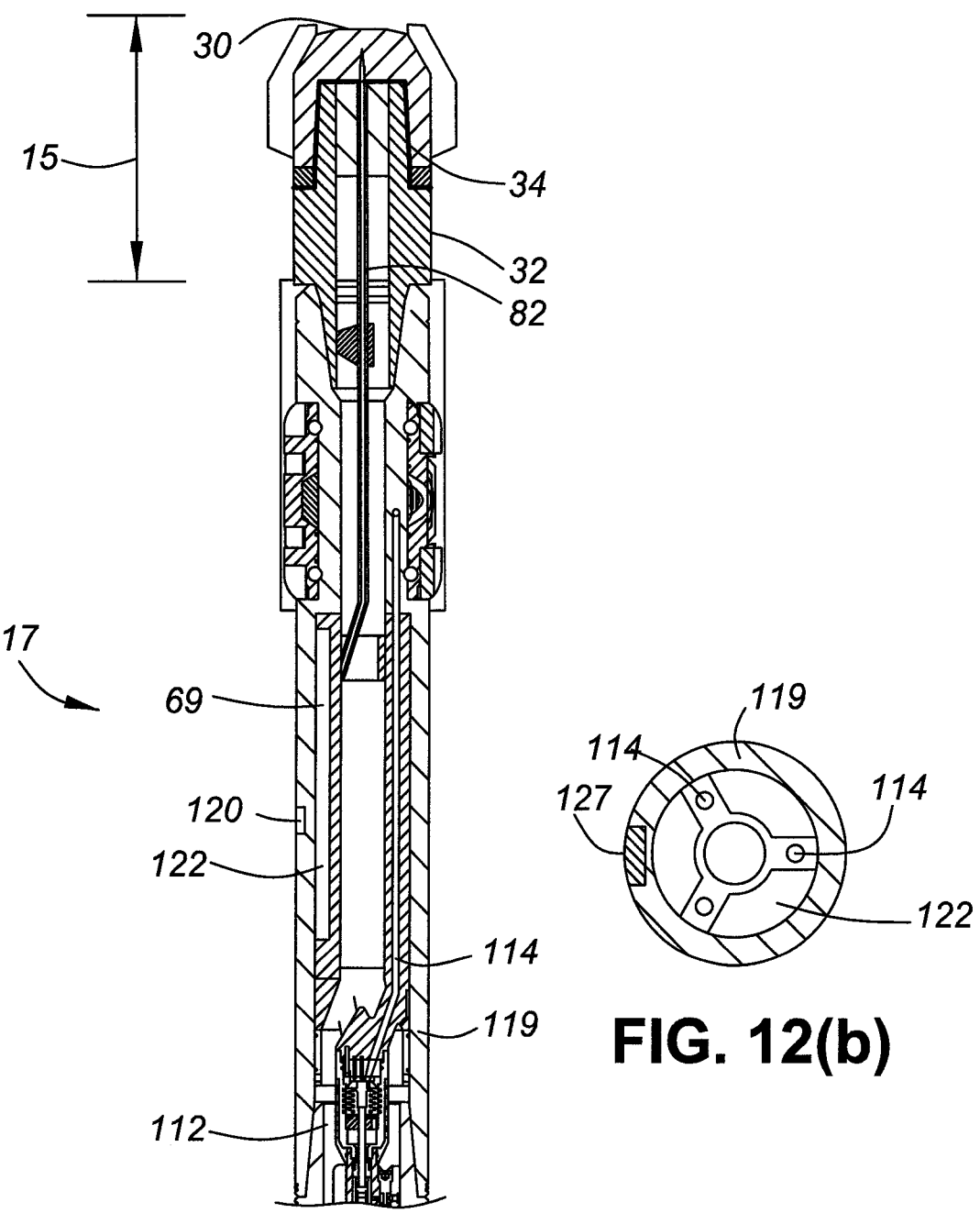
FIGS. 12(a) and (b) are schematic side and cross sectional views of the drill bit assembly of the third embodiment connected to a RSS sub having electronics mounted in an annular region of the sub.

The following embodiments described below and shown in FIGS. 9 to 12 locate the electronics equipment 69 in a separate sub of the bottom hole assembly 1 and use the embodiment of the drill bit assembly 15 as shown in FIG. 7, and are compatible with drill strings with steerable systems. FIG. 9 shows an embodiment wherein the electronics are packaged in a bit box assembly of a bent sub in directional drilling assembly that uses a PDM and a bent sub. FIGS. 10 to 12 show embodiments wherein the electronics are packaged in a bias unit of the RSS 17.

Referring to FIG. 9, a bent sub assembly is mounted below a positive displacement motor (not shown) and has a bit box 92 which houses the electronics equipment 69. The bit box may include an inclinometer 96, electronics with battery 98, gamma-ray detector (not shown), shock, vibration, temperature, or other sensors. The bit box may also have a full gauge stabilizer 102 which may be needed for directional control. Otherwise, the increased length of the BHA below the bent sub can cause drifts.

A drive shaft 100 connects the bit box to the bent sub (not shown). The screw-on stabilizer 102 can be sized to match the drill bit assembly 15, and may cover the pockets that contain electronics and battery. An inclinometer 96 can be mounted in the center of the assembly, on axis. The insulated rod 82 connects the bit head 30 to the electronics equipment 52 in the pockets. The electronics 52 equipment is provided with an EM transceiver and the rod 82 acts to electrically connect the matrix body 30 to electronics 52.

Referring now to FIGS. 10 to 12, to use the drill bit assembly 15 with a rotary steerable (RSS) sub 17, such as the PowerDrive™ system manufactured by Schlumberger, the drill bit assembly 15 should be as short as possible to allow for aggressive side cutting. Therefore, the electronics equipment 69 is located in the RSS sub 17 itself, and not in a separate tool sub. FIGS. 10, 11, and 12 show three different embodiments which locate the electronics equipment in different parts of a bias unit of the RSS sub 17. In each embodiment, the distance between steering pads 111 in the RSS sub 17 and the drill bit assembly 15 is unchanged. Also, a spider valve 112 in the RSS sub 17 remains unchanged. However, hydraulic lines 114 between the spider valve 112 and activating pistons (not shown) are longer to provide room for the electronics equipment 69 in the RSS sub 17. In each of these embodiments, the conductor 82 (wire or rod) electrically couples the bit head 30 to the electronics equipment 69 in the RSS sub 17.

In the embodiment shown in FIG. 10, the electronics equipment 69 is located in a mandrel cartridge 116 located in a mandrel of the RSS sub 17. The insulated rod 82 connects the electronics equipment 69 to the bit head 30. The three hydraulic lines 114 are routed in tubes between the pistons and the spider valve 112.

In the embodiment shown in FIG. 11, the electronics equipment 69 are located in sidewall pockets 118 machined into an annular body 119 of the RSS sub 17 (i.e. the drill collar). This method of mounting electronics has been extensively used in logging-while-drilling (LWD) tools known in the art. One advantage of this approach is easy access to the electronics or to replace a battery. The three hydraulic lines 114 are gun-drilled holes in the drill collar of the RSS sub 17. In addition, other sensors, such as an electrode 120, can be integrated into the drill collar. An annular pressure measurement device (not shown) could also be integrated into the drill collar of the RSS sub 17.

In the embodiment show in FIG. 12, the electronics equipment 69 are located in an annular electronics chassis 122 of the RSS sub 17. An annular chassis is used in many current LWD tools as known in the art. The hydraulic lines 114 are run through gun-drilled holed in the chassis 122. Alternatively, three tubes (not shown) could be used. The annular chassis 122 allows for external sensors to be mounted on the drill collar, and internal sensors to be mounted on the chassis 122. For example, internal and external pressure sensors 120 could be used to monitor the pressure drop across the drill bit assembly 15. Optionally, sensors (not shown) can be provided to monitor the pressures in the hydraulic lines to the pistons. This information could be used to determine if the RSS sub 17 is operating correctly.

Electromagnetic Telemetry with Drill Bit Assembly

Figure 13:
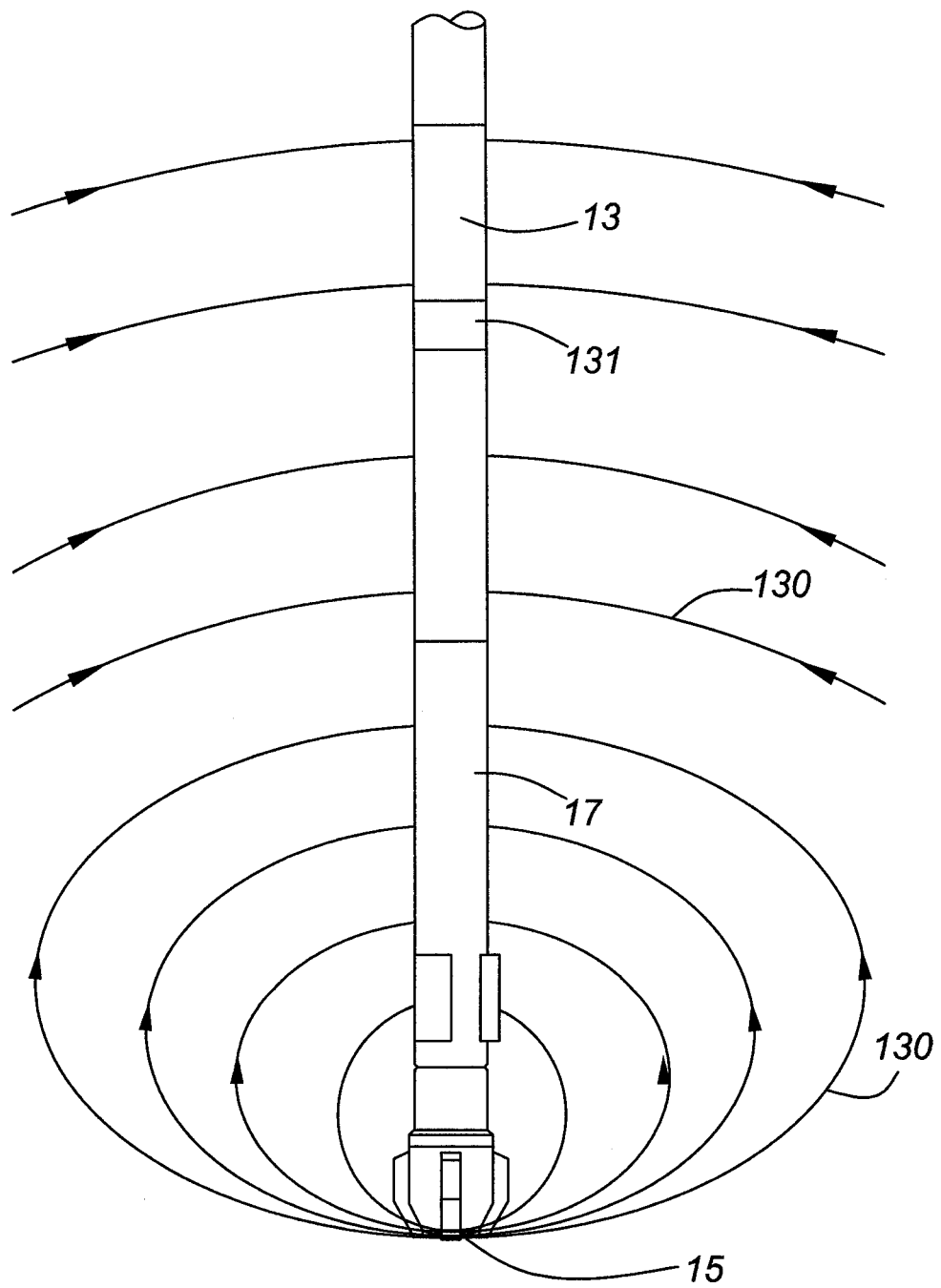
FIG. 13 is a schematic view of the drill bit assembly transmitting an EM telemetry wave to an up-hole MWD tool.

The electronics equipment 69 includes a short range electromagnetic (EM) telemetry system that transmits data between the drill bit assembly 15 and the MWD module 13 located up-string. The uplink transmission may be used to send measurements from the drill bit assembly 15 to the MWD module 13. The EM telemetry system applies an alternating voltage across the drill bit assembly 15 to produce an alternating electric current (130) in the formation, as illustrated in FIG. 13. If there is a second insulated gap 131 located in the BHA 1, e.g. in the MWD module 13, then the formation current results in a voltage drop across the MWD module's 13 insulated gap (a mud pulse telemetry tool could also be used, provided there is a sub with an insulated gap attached to it). For example, consider an uplink transmission from the drill bit assembly 15 to the MWD module 13. The basic electronics 53 for the MWD module 13 in receive mode is illustrated in FIG. 14, and the basic electronics 53 for the EM telemetry system of the drill bit assembly 15 in transmit mode is illustrated in FIG. 15.

Figure 14:
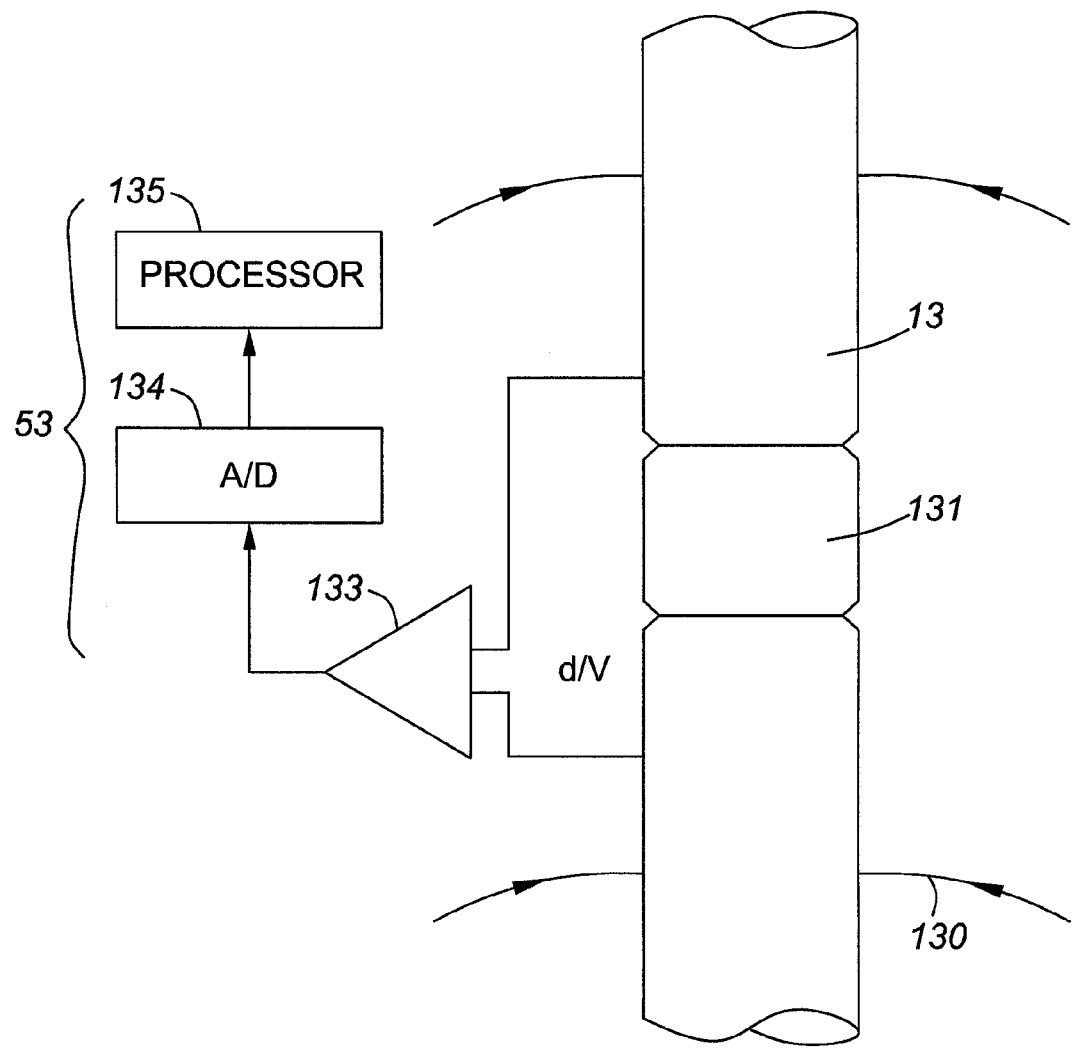
FIG. 14 is a schematic of an the MWD tool receiving the EM telemetry wave from the drill bit assembly.

Referring to FIG. 14, the electronics equipment 69 are shown outside the drill collar for convenience in FIG. 14. In practice, electronics equipment 69 will be located within the drill collar. The electrical current 130 in the formation results in a voltage difference dV across insulated gap 131. Differential voltage dV is fed into a high gain operational amplifier 133; the analog output of which is converted in to a digital signal via A/D 134 and fed into processor 135. Processor 135 demodulates the signal carried by electric current 130 to receive data transmitted from drill bit assembly 15. The received data may be transmitted to the surface by the MWD module 13.

Figure 15:
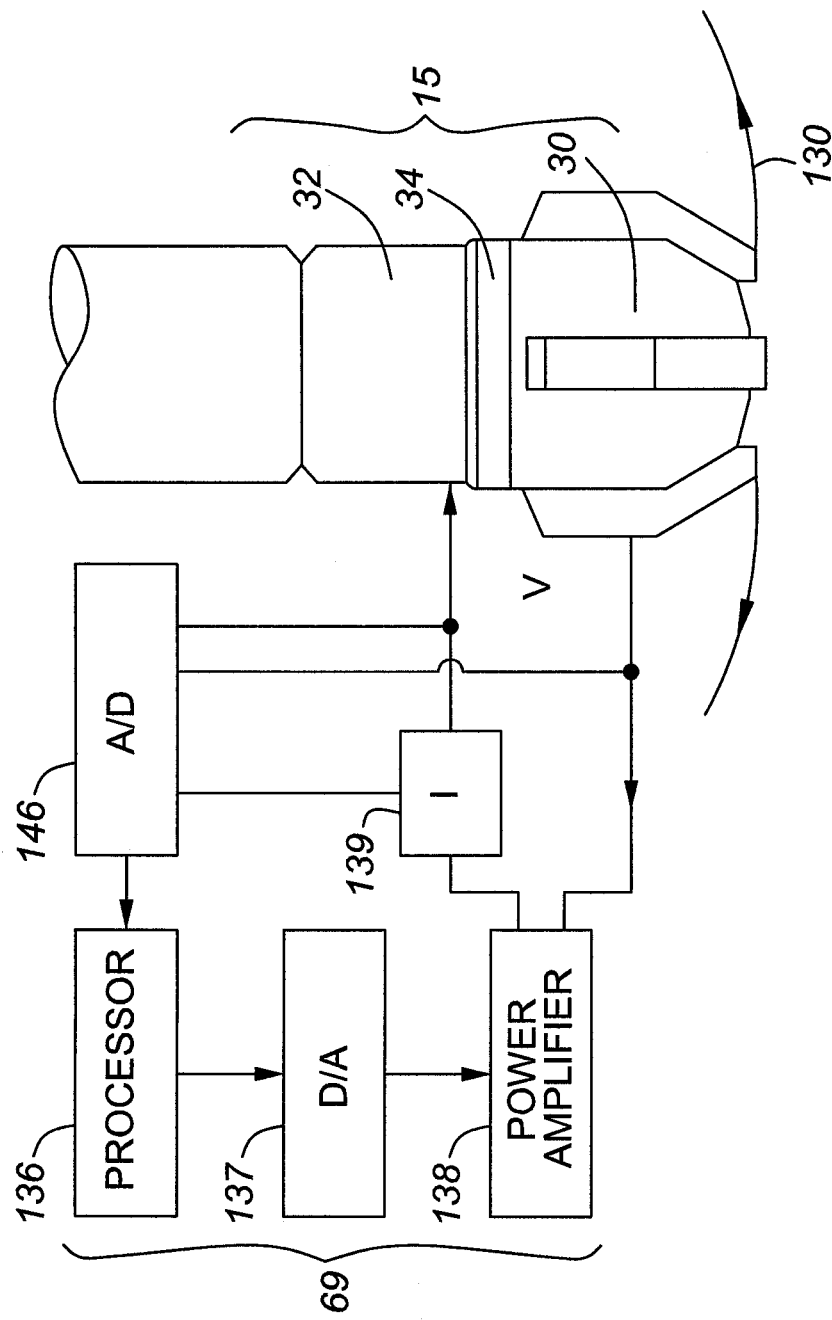
FIG. 15 is a schematic of EM telemetry transmitting electronics of the drill bit assembly.

Referring to FIG. 15, electronics 69 generates electric current 130 which flows into the formation from the matrix body 30 and double pin body 32. Electric current 130 is modulated to transmit data from drill bit assembly 15 to MWD module 13. Processor 136 sends digital data to digital to analog converter D/A 137. Analog signal from D/A 137 is amplified by power amplifier 138 and resulting voltage V is applied across insulated gap 34. Current sensor 139 measures transmitted current I, and analog to digital convertor A/D 146 may monitor the current I and voltage V. Processor 136 may then adjust the current I and voltage V for optimum transmission efficiency.

Figure 16:
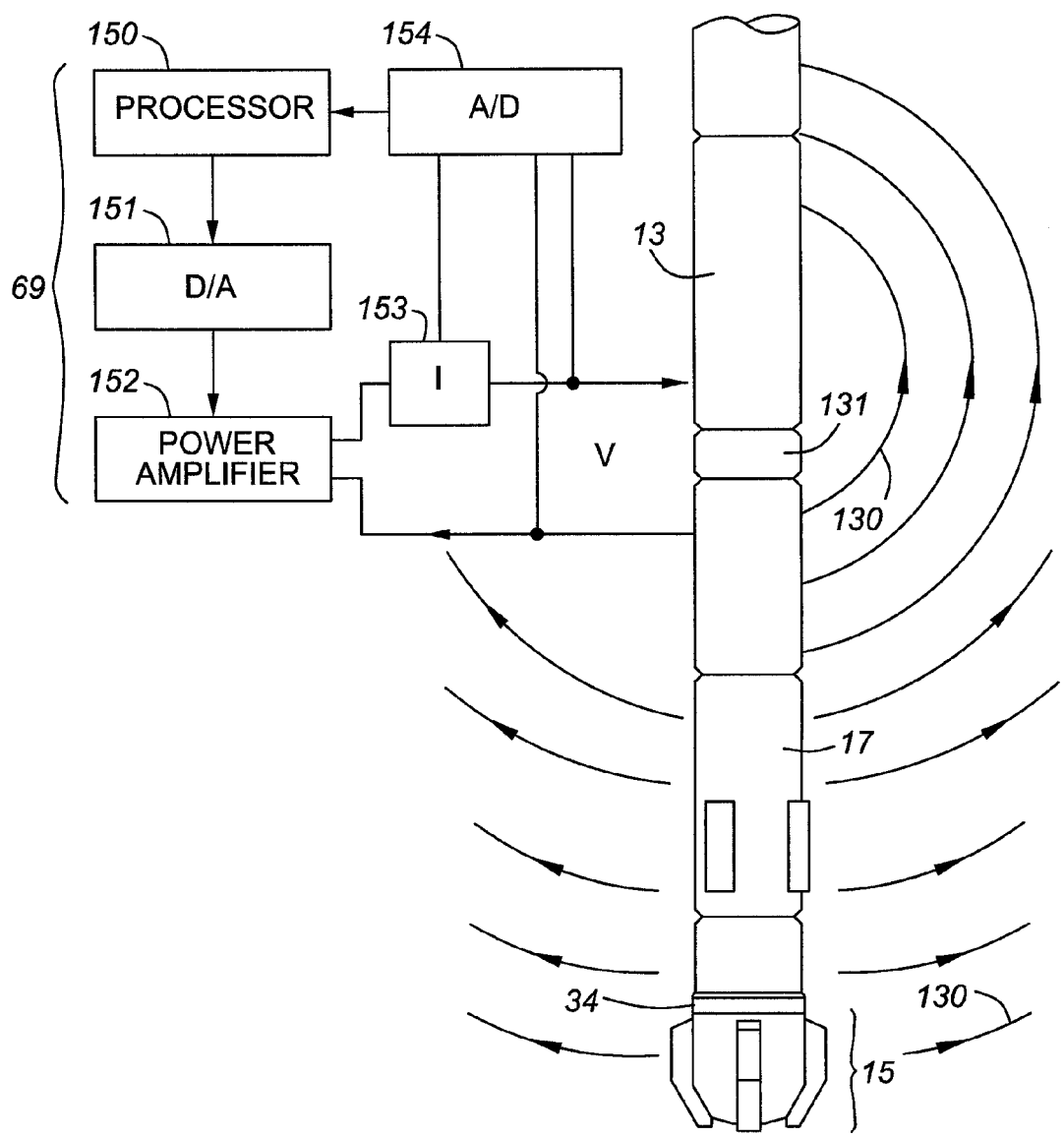
FIG. 16 is a schematic of the MWD tool transmitting an EM telemetry wave to the drill bit assembly.
Figure 17:
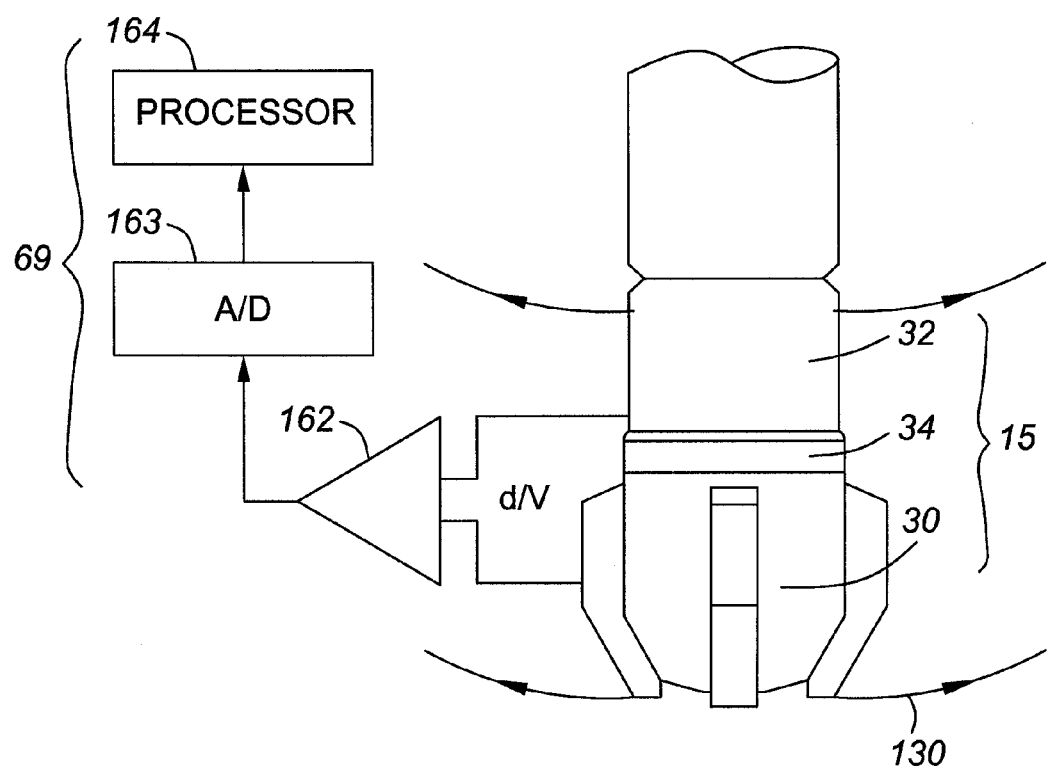
FIG. 17 is a schematic of EM telemetry receiver electronics of the drill bit assembly.

FIGS. 16 and 17 illustrate the downlink from the MWD module 13 to the drill bit assembly 15. The downlink may be used to send commands from the MWD module 13 to the drill bit assembly 15. Such commands may include requests for data from MWD module 13 to drill bit assembly 15.

Referring to FIG. 16, the electronics 69 in MWD module 13 may generate a modulated voltage V across insulated gap 131. The resulting electric current 130 produces a differential voltage dV across the insulated gap 34 of drill bit assembly 15. Processor 150 sends digital command to digital to analog converter D/A 151. Analog signal from D/A 151 is amplified by power amplifier 152 and resulting voltage V is applied across insulated gap 131. Current sensor 153 measures transmitted current I, and analog to digital convertor A/D 154 may monitor the current I and voltage V. Processor 150 may then adjust the current I and voltage V for optimum transmission efficiency.

Referring to FIG. 17, the receiving electronics 69 of the drill bit assembly 15 is shown. Differential voltage dV is fed into a high gain operational amplifier 162; the analog output of which is converted in to a digital signal via A/D 163 and fed into processor 164. Processor 164 demodulates the signal carried by electric current 130 to receive data transmitted from MWD module 13 to drill bit assembly 15.

Typical carrier frequencies are expected to lie between 1 Hz and a few hundred Hertz. Since the distance between the drill bit assembly 15 and the MWD module 13 will be approximately 100 feet or less, the EM telemetry system should be able operate at low power levels.

Multiplexing

Figure 18:
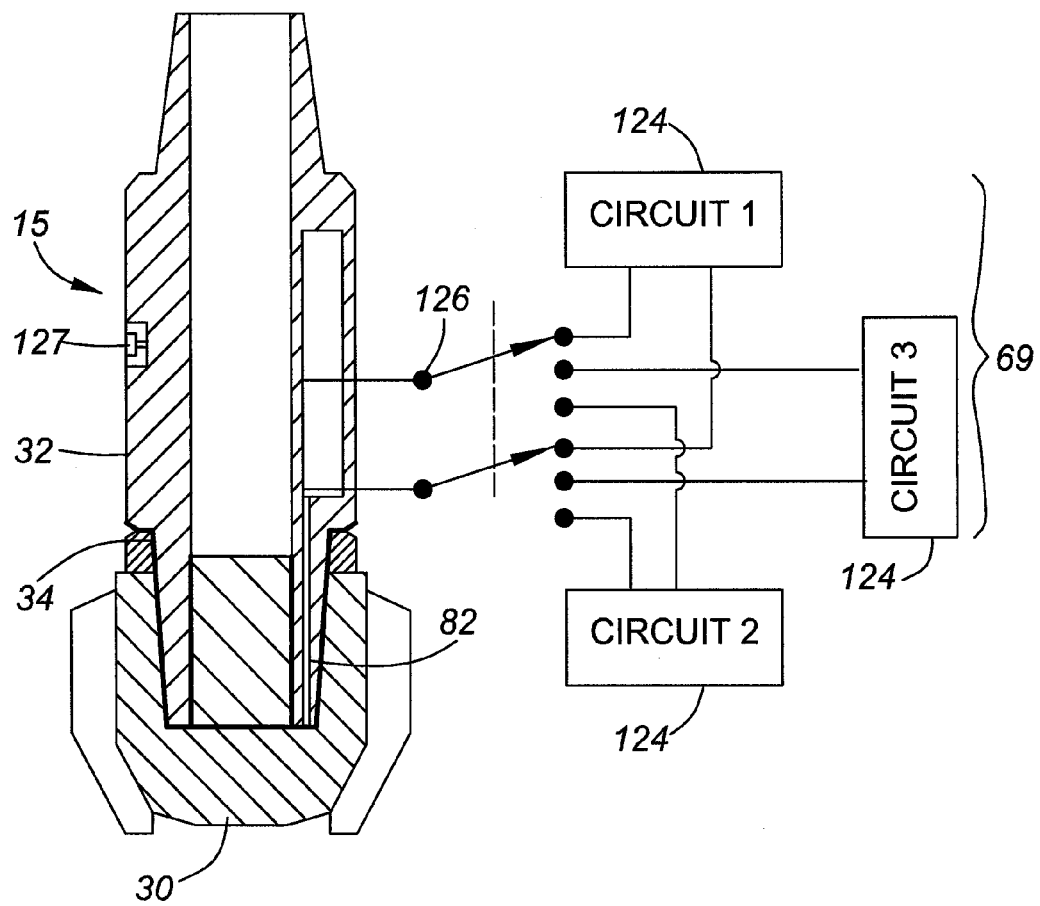
FIG. 18 is a schematic showing multiplexing different circuits in the drill bit assembly to perform certain functions.

The insulated gap joint 34 of the drill bit assembly 15 can allow many different functions. FIG. 18 illustrates how the drill bit assembly 15 can be multiplexed by switching the connection of the conductor wire 82 between different circuits 124 using a switch 126, wherein each circuit 124 performs a different function that uses the gap joint 34. For example, "Circuit 1" can be provided with EM transmitter equipment and be dedicated to transmitting data (uplink) to the MWD module 13, and Circuit "2" can be provided with EM receiver equipment and be dedicated to receiving data from the MWD module 13 (downlink) as was described above. Circuit "3" can be provided with measurement equipment and be used to conduct measurements at the drill bit assembly 15, e.g. measure the streaming potential and/or the resistivity at the drill bit assembly 15. Additional circuits (not shown) can also be provided with measurement equipment to take measurements at the drill bit assembly 15. For example, an additional circuit can be provided to measure azimuthal resistivity using one or more button electrodes 127 located in the sidewall of the drill bit assembly 15.

The MWD module 13 can act as controller for the drill bit assembly 15. The MWD module 13 can acquire and transmit standard MWD data (e.g. direction and inclination) to the surface via EM telemetry (when provided with an insulated gap joint), and receive EM downlink commands from the surface. In turn, the MWD module 13 can transmit commands to the drill bit assembly 15 and receive data from the drill bit assembly 15. For example, the MWD module 13 can command the electronics equipment 69 in the drill bit assembly 15 to change the position of the switch 126 to connect Circuit 3 to the wire 82 and operate Circuit 3 to perform a resistivity measurement. After the measurement is completed, the electronics equipment 69 operates the switch 126 to connect Circuit 1 to the wire 82 and operate Circuit 1 to transmit data to the MWD module 13, where the data may be further processed and transmitted to the surface.

Resistivity at the Drill Bit

A resistivity measurement can be made at the drill bit assembly 15 in conductive water based mud (WBM). Referring to FIG. 16, the MWD module 13 transmits a sinusoidal current signal of known amplitude and known voltage drop (V) across its insulated gap 131. A typical frequency might be 1 Hz, but higher or lower frequencies are also useable. Because the drill bit assembly 15 is maintained at the same electric potential as the drill collars below the gap collar 131, the current emitted from the drill bit assembly 15 is passively focused into the formation, thus greatly minimizing borehole effects.

According to a first embodiment for measuring bit resistivity, the drill bit assembly 15 is provided with electronics equipment 69 having measurement circuitry (not shown) for performing a resistivity measurement of a reservoir formation. The sinusoidal current signal from the MWD module 13 which crosses the insulated gap 131 will be received by the drill collar below the MWD module 13 and be conducted through sub 17 and into the double pin body 32. A coil of a transformer electrically couples the pin body 32 to the conductor 82; therefore, the current will conduct through this coil and the conductor 82 and into the bit head body (the current will thus be referred to as $I_b$"). Current $I_b$ flows into the formation through the bit head's face and is measured using the transformer that provides a low impedance to the current.

An amplifier (not shown) boosts the voltage on the transformer's secondary, which is then converted from analog to digital by an ND circuit and fed into a processor. Since the voltage on the drill bit assembly 15 is the same as the voltage on the drill collar below the MWD module/sub 17 (collectively "lower BHA"), the voltage at the drill bit assembly 15 can be determined by the MWD module 13 by measuring the voltage drop across the insulated gap 131. Once the drill bit current $I_b$ has been determined, it is transmitted to the MWD module 13 (for example using EM telemetry equipment in multiplexed connection to the drill bit assembly 15), where the bit resistivity is calculated from $R_b=KV/I_b$. K is a constant that is determined by the geometry of the BHA 1. This provides a bit resistivity measurement that is similar to that of the RAB or GVR tools commercially marketed by Schlumberger Corporation.

An alternative embodiment for measuring bit resistivity is provided by a resistivity measurement circuit, a high input impedance operational amplifier detects the voltage drop between the drill bit face and the double pin body. The amplifier drives a current ($I_b$) onto the bit head's face such that the voltage drop across the operational amplifier is zero. The voltage drop across a precision resistor provides the current measurement. The analog current measurement is converted into a digital signal by A/D convertor, which is then received by the processor. The processor has a memory with instructions for execution by the processor to determine bit resistivity from the current measurement $I_b$ and the measured voltage drop across the gap joint 34.

This electronics implementation is well suited to low operating frequencies, but requires more battery power since the current from the drill bit assembly 15 must be provided by local battery power (power supply not shown). In the previous circuit, the bit current is provided by the MWD module 13.

Anti-Rotation Barriers

As is well known in the art, the tapered coarse threads in this application efficiently carry both axial and bending loads, and the interlock between the threads provides added mechanical integrity should the thermoplastic gap joint 34 be compromised for any reason. The thermoplastic gap joint 34 provides an arrangement that is self-sealing since the thermoplastic gap joint 34 is nonporous, free from cracks or other defects that could cause leakage, and was injected and allowed to set under high pressure. As a result, drilling fluids cannot penetrate through the thermoplastic material and cannot seep along the boundary between the thermoplastic gap joint 34 and the surfaces of the bit head and pin 30, 32. Thus no additional components are necessary to seal this assembly.

In one embodiment, a certain amount of torsion resistance is provided by the high normal force between the thermoplastic gap joint 34 and the threads of the pin body 32 and bit head 30 resulting from the high injection pressure of the thermoplastic into the interstitial cavity. This high normal force in turn provides high frictional force resisting movement of the threads. Enhanced torsion resistance is achieved by elongated barriers 40 which are formed by injecting thermoplastic material into grooves 48, 52 in the surfaces of the male and female threaded sections of the pin and bit head 32, 30 respectively. The grooves 52 in the male threaded section of the pin body 32 prevents the thermoplastic material therein 40 from rotating with respect to the pin body 32. Similarly, the grooves 48 in the female threaded section of the bit head 30 prevents the thermoplastic material therein (not shown) from rotating with respect to the bit head 30. Grooves in both the male and female sections of the bit head and pin 30, 32 are preferred to provide enhanced torsion resistance with there being no need for the grooves to be proximately aligned.

Figure 19:
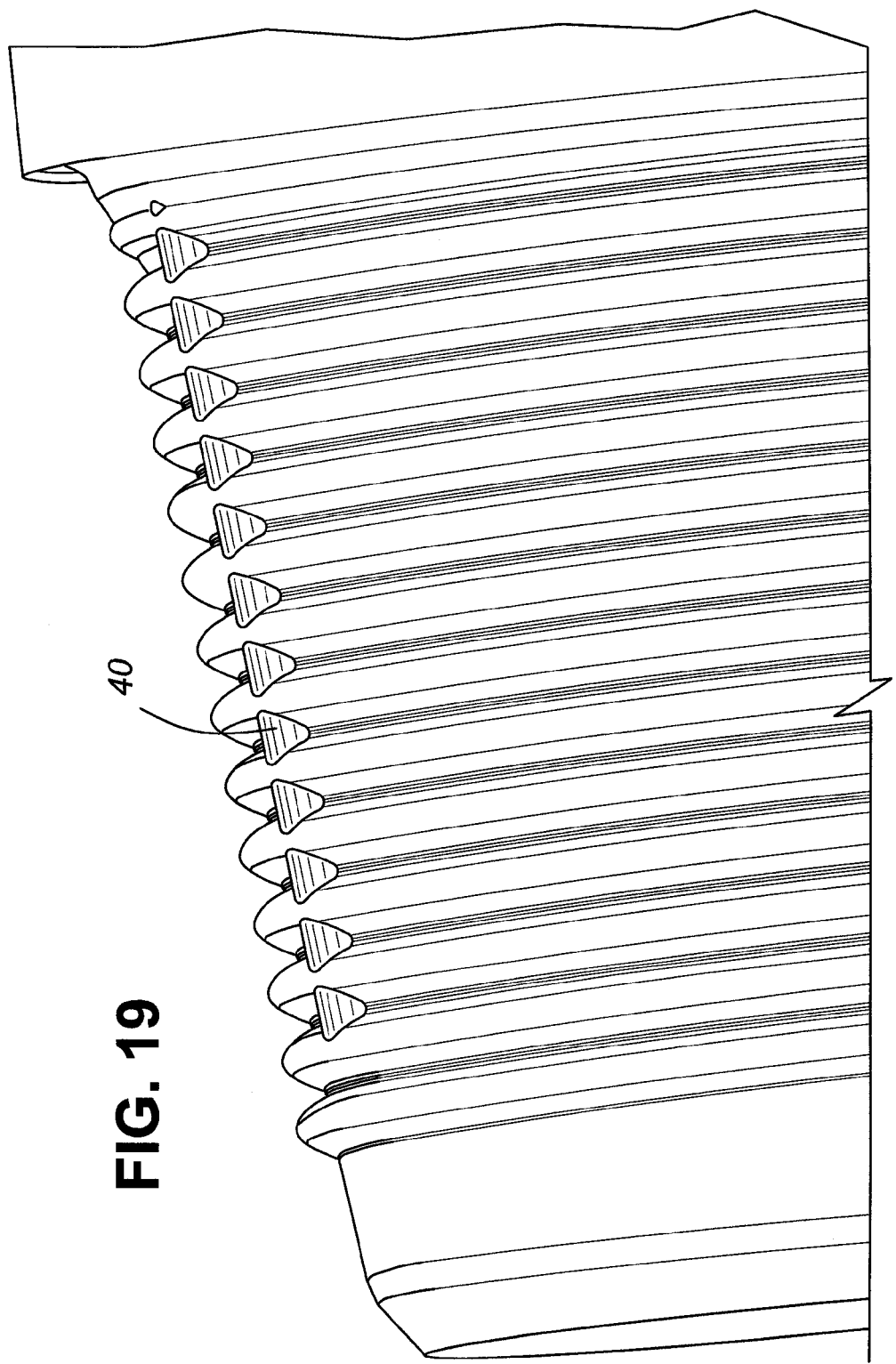
FIG. 19 is a perspective view of a male-threaded engagement section of the pin body having coated thereon the electrical isolator gap joint having an anti-rotational barrier produced by an elongated groove machined into the threads of a female threaded engagement section of the bit head.

As shown in FIG. 19, each barrier 40 extends longitudinally along the threaded section of the pin body 32. The barrier 40 shown in FIG. 19 has been formed by injecting thermoplastic material into the grooves 48 in the female threaded section of the bit head 30. Segments of the barrier 40 are shaded in this figure to better illustrate the portions of thermoplastic material that must be sheared in order to decouple the connection between the male and female sections of the bit head 30 and pin body 32. These segments are herein referred to as anti-rotation segments. In this embodiment, the first barrier 40 provides shear resistance against the female threads, and a second barrier (not shown) is provided which provides shear resistance against the male threads. In an alternative embodiment, only a single barrier is provided, proximate to either the male or female threads, providing some torsion resistance. However, it is clear that having a barrier preventing rotation of both male and female threads with respect to the dielectric material provides better torsion resistance than a single barrier. This is because the threads which do not have a barrier will be easier to unscrew than the threads which incorporate a barrier. While multiple barriers extending into grooves 48, 52 of both the male and female threaded sections are shown in these Figures, anti-rotation resistance can alternatively be provided with just two barriers 40, one extending into one groove 48 in the female threaded section, and one extending into one groove 52 in the male threaded section.

Figure 20:
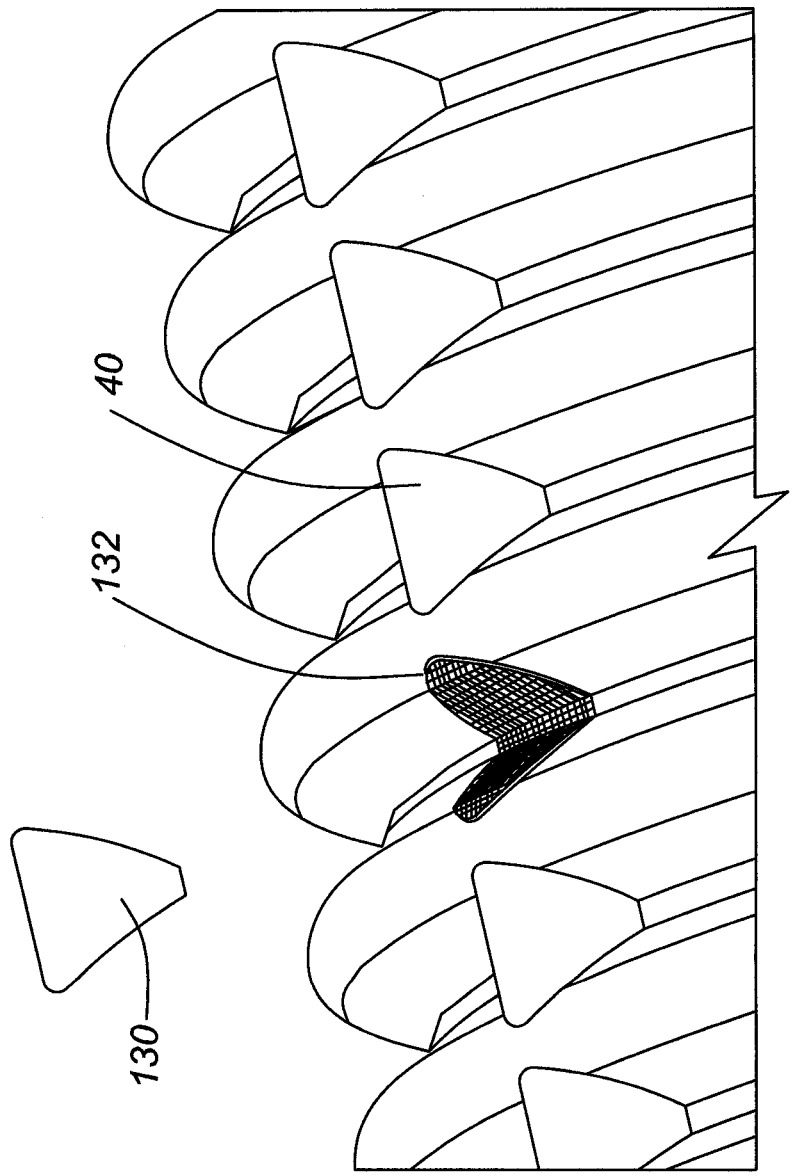
FIG. 20 is a perspective view showing one anti-rotation segment shearing away from the remainder of the barrier.

FIG. 20 illustrates what must happen for the female threads to uncouple from the thermoplastic gap joint 34. All segments 130 must shear away from the remainder of the thermoplastic material (for clarity, only one sheared segment 130 is shown). The crosshatched pattern 132 shows the 'shear area' of one anti-rotation segment 40. Varying the depth of the grooves 48, 52 will affect the shear area of each segment. The torsion resistance of each individual segment is determined by multiplying the shear area with the shear strength of the thermoplastic material and the moment arm, or distance from the center axis, as the following equation denotes:

$$T_i = A_i S D_i$$

where:
- $T_i$ is the torsion resistance of an individual anti-rotation segment,
- $A_i$ is the area of thermoplastic material loaded in pure shear,
- S is the shear strength of the thermoplastic material, and
- $D_i$ is the segment moment arm or distance from the center axis.

The male threaded section of the pin body 32 has multiple parallel anti-rotation grooves 48 spaced around the pin body 32 that create a thermoplastic gap joint 34 having multiple barriers (not shown) against the male threads. Multiple barriers provide additional shear resistance over a single barrier. In this embodiment, corresponding grooves 52 (see FIG. 2) are found in the female threaded section of the bit head 30 to provide multiple barriers against the female threads. Torsion resistance between the thermoplastic gap joint 34 and the male threaded section of the pin body 32 (or the thermoplastic gap joint 34 and the female threaded section of the bit head 30) is determined by the sum of the resistances provided by each individual segment, as follows:

$$T_M \text{ or } T_F = \sum_1^{N_{slot}} \sum_1^{N_{seg}} T_i = \sum_1^{N_{slot}} \sum_1^{N_{seg}} A_i S D_i$$

where:
- $T_M$ is the torsion resistance between thermoplastic gap joint 34 and male threaded section of the pin body 32;
- $T_F$ is the torsion resistance between thermoplastic component and female threaded section of the bit head 30;
- $N_{seg}$ is the number of anti-rotation segments per slot;
- $N_{slot}$ is the number of slots in male or female threaded section;

Since rotation of the thermoplastic gap joint 34 with respect to either of bit head and pin 30, 32 would constitute decoupling of the joint, torsion resistance for the entire joint is the lesser of $T_M$ or $T_F$.

As illustrated, the torsion resistance provided by this embodiment is a function of geometry and the shear strength of the material. With the formulae presented and routine empirical testing to confirm material properties, the quantity of anti-rotation segments required to produce any desirable safety margin is easily determined by one skilled in the art.

Alternate Embodiments

Figure 21:
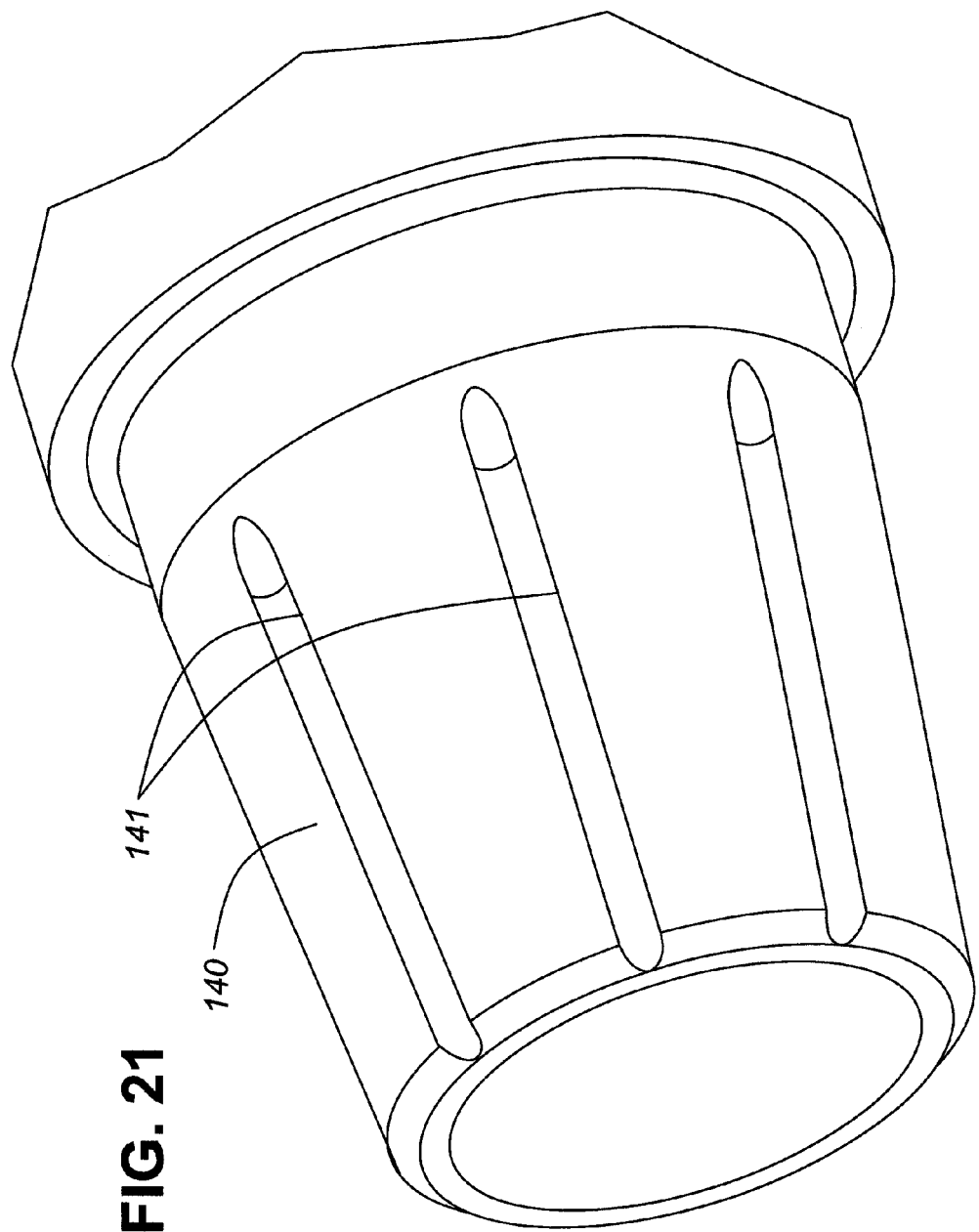
FIG. 21 is a perspective view of a threadless engagement section of the pin body having thereon an elongated groove parallel to the pin axis, for producing an anti-rotation barrier in the electrical isolator component according to an alternative embodiment.

Referring to FIG. 21 and according to another embodiment, a male engagement section 140 of the pin body 32 has a smooth threadless surface having multiple milled straight and parallel grooves 141 spaced around the pin body 32. These grooves 141 create multiple elongated straight thermoplastic material barriers (not shown). Similar straight grooves are found in a female threadless engagement section that creates multiple barriers to rotational movement in the thermoplastic material (not shown) with respect to the bit head 30. The barriers themselves provide torsion resistance, illustrating that a thread form is not required to provide torsion resistance. In the embodiment shown in FIGS. 2 to 6, the thread form is present to primarily resist axial and bending loads, and does not contribute as significantly to torsion resistance.

Figure 22:
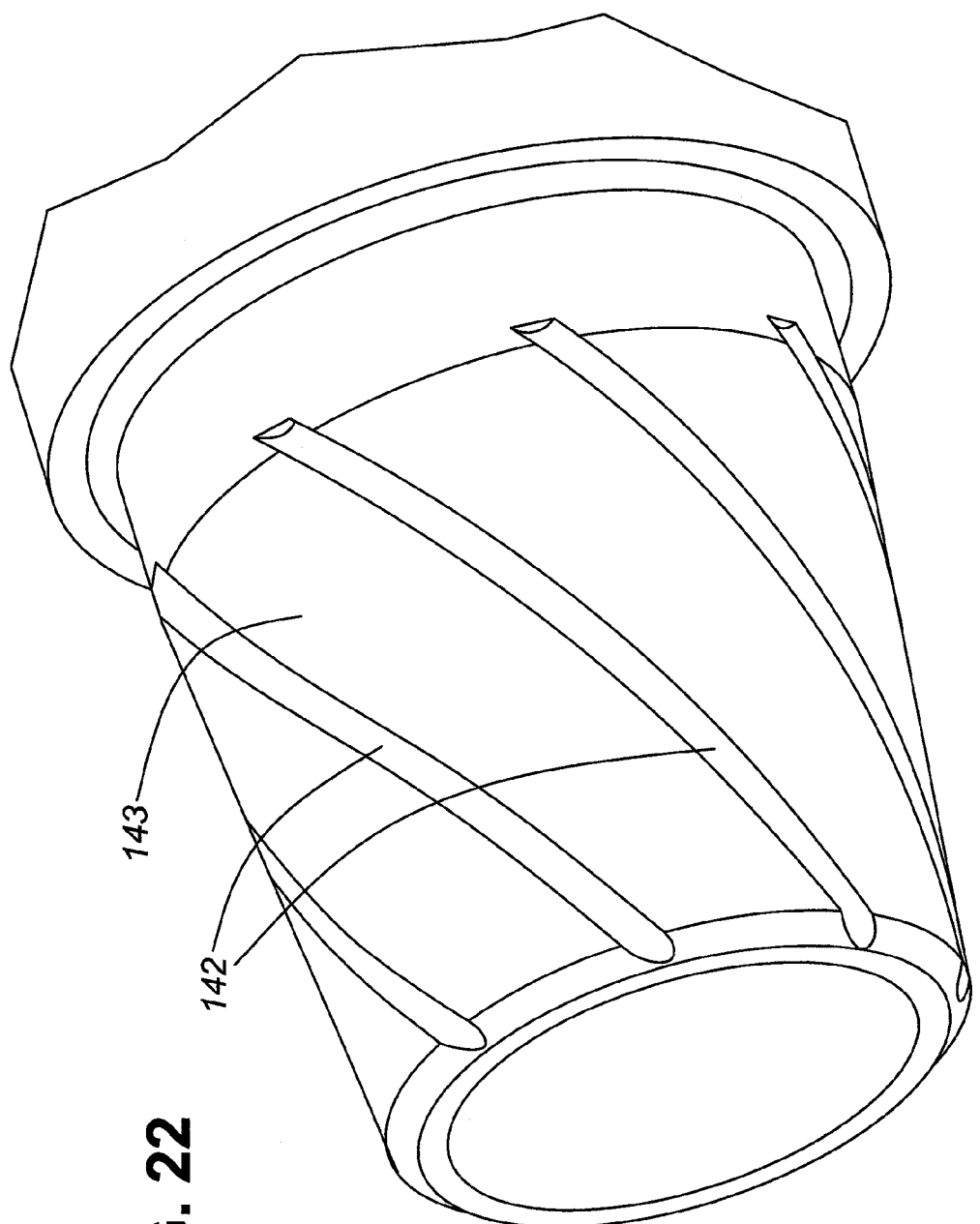
FIG. 22 is a perspective view of a threadless engagement section having thereon multiple grooves spaced side-by-side and non-parallel to the pin axis for producing multiple anti-rotation barriers in electrical isolator component according to an alternative embodiment.

Referring to FIG. 22 and illustrating another embodiment, a smooth threadless surface 142 is shown that has multiple milled curved grooves 143 that extend at an angle to the axis of the pin body 32. The grooves 143 create curved and angled thermoplastic barriers that provide both axial and torsional resistance against the pin body 32. Similar curved grooves are found in the female engagement section (not shown) of the bit head that serve to create curved and angled barriers (not shown) that provide both axial and torsional resistance against the bit head 30.

Figure 23:
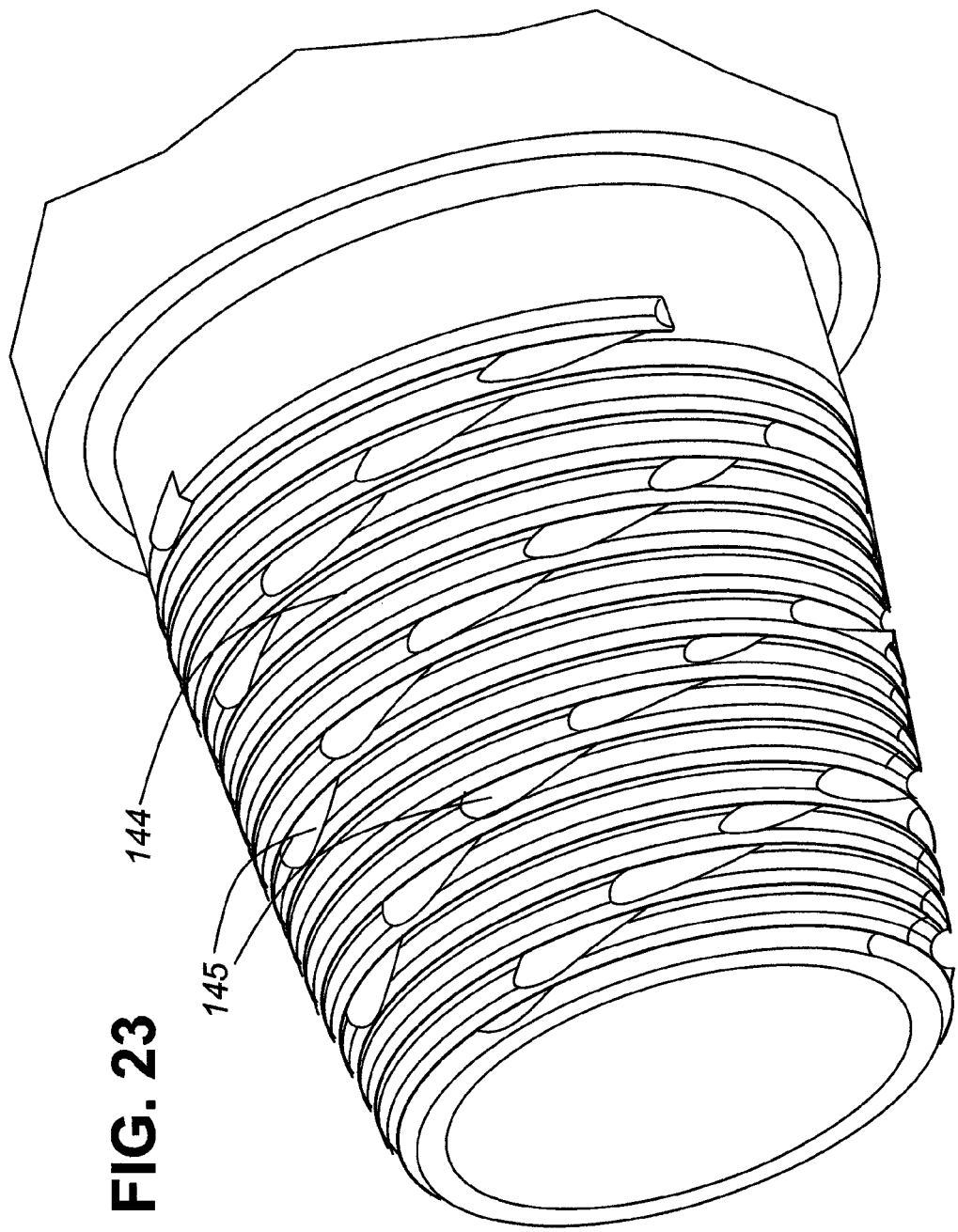
FIG. 23 is a perspective view of a male-threaded engagement section of the pin body having thereon multiple grooves spaced tail-to-end in a reverse threaded pattern for producing multiple anti-rotation barriers in the electrical isolator gap joint according to an alternative embodiment.

Referring to FIG. 23 and illustrating a further embodiment, the threaded surface of the male engagement section 144 of the pin body 32 is provided with curved grooves extending head-to-tail that are fashioned as a reverse thread 145 overlapping the threads of the pin body 32. A similar reverse thread is found in the threaded surface of the complementary female engagement surface (not shown) of the bit head 30. The grooves in both components create curved barriers in a dielectric component (not shown). The torsion resistance provided by these barriers can be adjusted by adjusting the characteristics of the grooves, e.g. the pitch and the number of thread starts and thread profiles.

Figure 24:
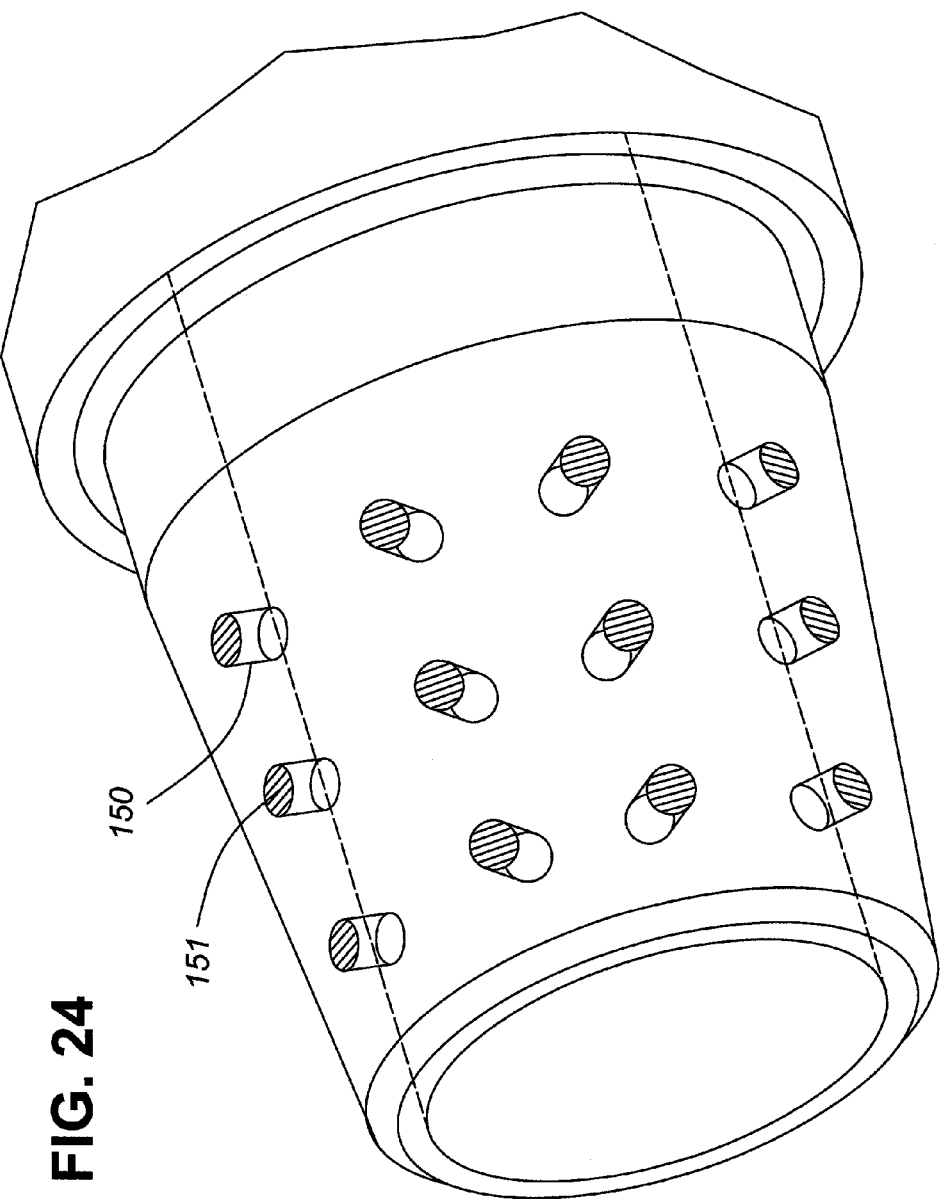
FIG. 24 is a perspective view of a threadless engagement section of the pin body having cylindrical holes spaced along the surface the engagement section for producing multiple anti-rotation barriers in the electrical isolator gap joint according to an alternative embodiment.

Referring to FIG. 24 and illustrating another embodiment, holes 150 are drilled into the surfaces of both male and female engagement sections of the pin and bit head 32, 30 respectively. Although a male engagement section having a smooth threadless surface is shown in this Figure, similar holes can be provided in threaded engagement section. Drill holes 150 serve as molds for creating multiple barriers in the thermoplastic material (not shown). The hatched regions 151 indicate shear areas of the barriers, and the 'hidden' lines illustrate that material remains in the holes after shearing. Although multiple rows of drill holes are shown in this Figure, a different number and layout of holes can be provided within the scope of the invention.

Figure 25:
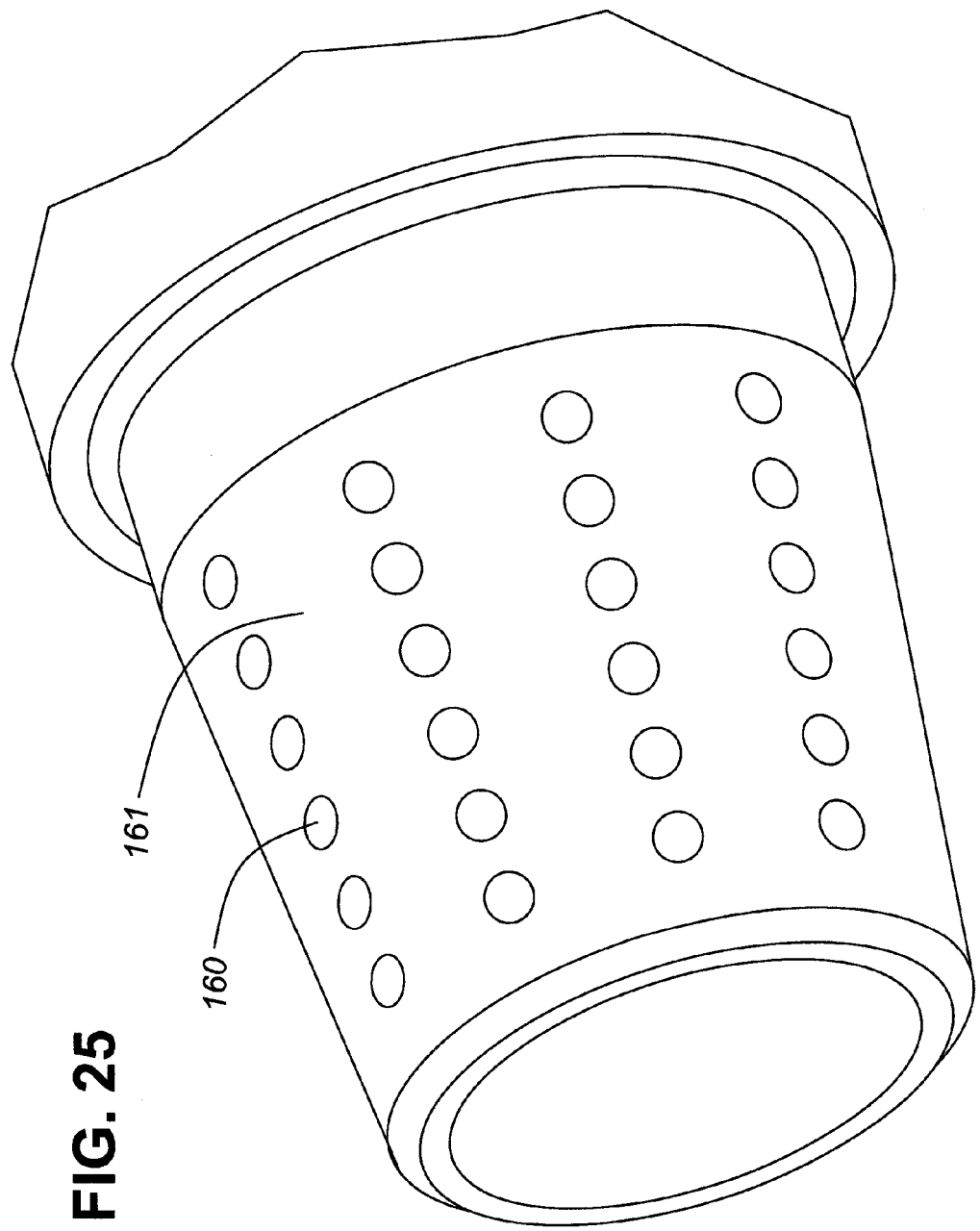
FIG. 25 is a perspective view of a male threadless engagement section of the pin body having dimples spaced along the surface of the engagement section for producing multiple anti-rotation barriers in the electrical isolator gap joint according to an alternative embodiment.

Referring to FIG. 25 and illustrating yet another embodiment, dimples 160 are provided in the surfaces of both male and female engagement sections of the pin and bit head 32, 30 respectively. Although a male engagement section having a smooth threadless surface is shown in this Figure, similar dimples 160 can be provided in a threaded engagement section. Dimples serve as molds for creating multiple barriers in the thermoplastic material (not shown). Such dimples can be fashioned into the material by forms of plastic deformation (e.g. pressed or impacted) or material removal (e.g. grinding, milling, sanding, etc.). Although multiple rows of dimples are shown in this figure a different number and layout of dimples is inferred to be within the scope of the invention.

While FIGS. 24 and 25 illustrate drill holes 150 and dimples 160 for creating torsion resistance barriers in the thermoplastic material 34, recessed portions of other realizable patterns or shapes could be used to create barriers that would be suitable for providing suitable torsion resistance.

Figure 26:
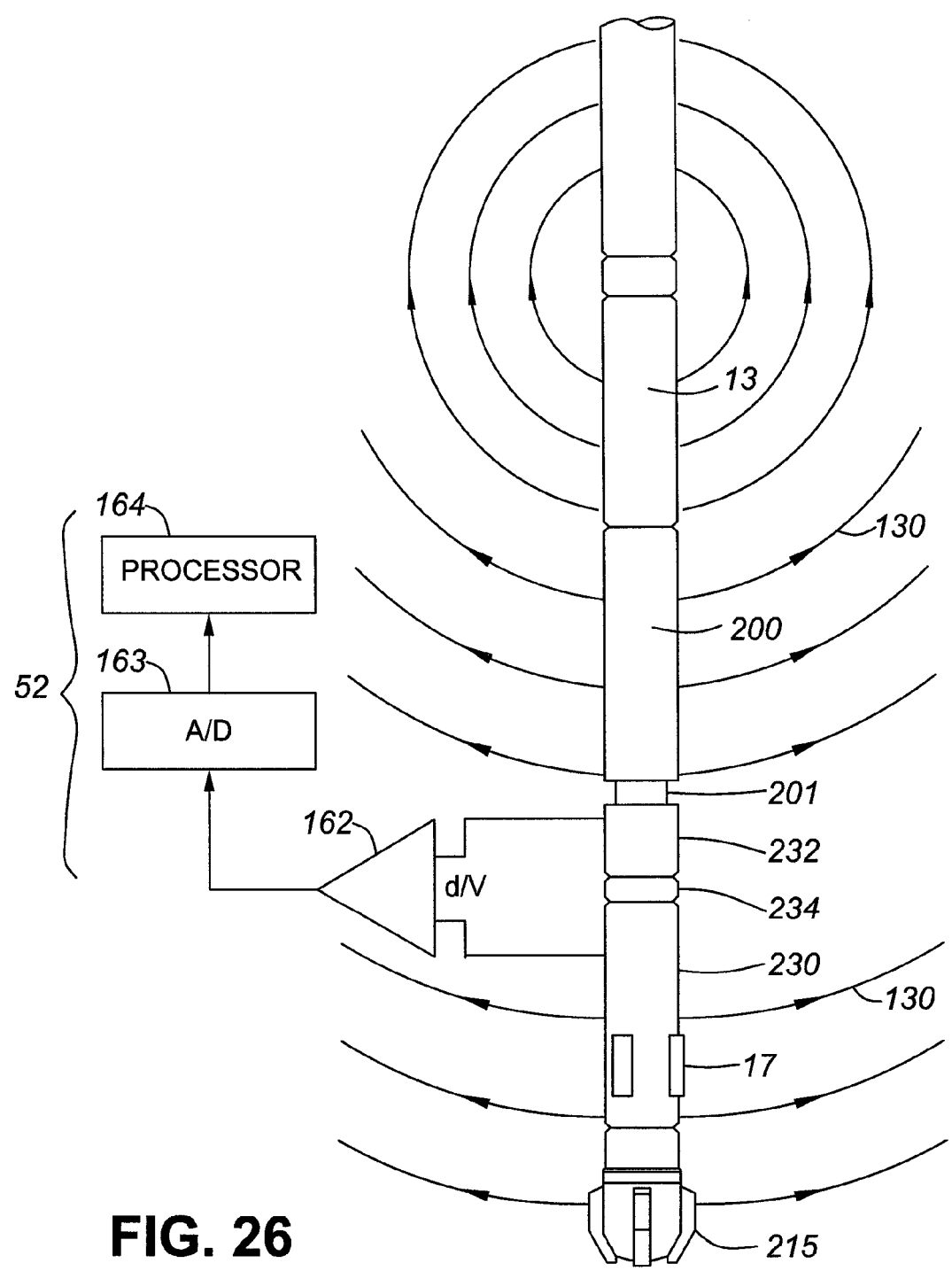
FIG. 26 is a schematic view of bottom hole assembly having a RSS sub with an insulated gap joint transmitting an EM telemetry wave to the MWD tool.

Referring to FIG. 26 and according to another embodiment, a drill bit assembly 215 is connected to rotary steerable (RSS) sub 17, such as the PowerDrive™ system manufactured by Schlumberger, which may be modified to include an insulated gap section 234 in the RSS drill collar. The RSS sub 17 may be run below mud motor 200 which rotates the RSS sub 17. The mud motor 200 has a rotating shaft 201 which attaches to RSS sub 17. Thus a direct electrical connection between the MWD module 13 and RSS 17 may be difficult to achieve such that there is no direct wire path between RSS 17 and MWD module 13. To provide communication between MWD module 13 and RSS 17, the electromagnetic telemetry system previously described for the drill bit assembly 15 may be adapted. To receive a directional drilling command from the MWD module 13, RSS 17 may measure the voltage dV generated across insulated gap 234 using electronics 52. The differential voltage results from modulated current 130 produced by MWD module 13. Differential voltage dV is fed into a high gain operational amplifier 162; the analog output of which is converted in to a digital signal via ND 163 and fed into processor 164. Processor 164 demodulates the signal carried by electric current 130 to receive data transmitted from MWD module 13. To transmit data from RSS 17 to MWD module 13, transmission electronics 53 similar to that shown for the drill bit assembly may be employed.

Communication may be established between any two down subs in the BHA provided each has an insulated gap with the associated electronics described herein.

Figure 27A:
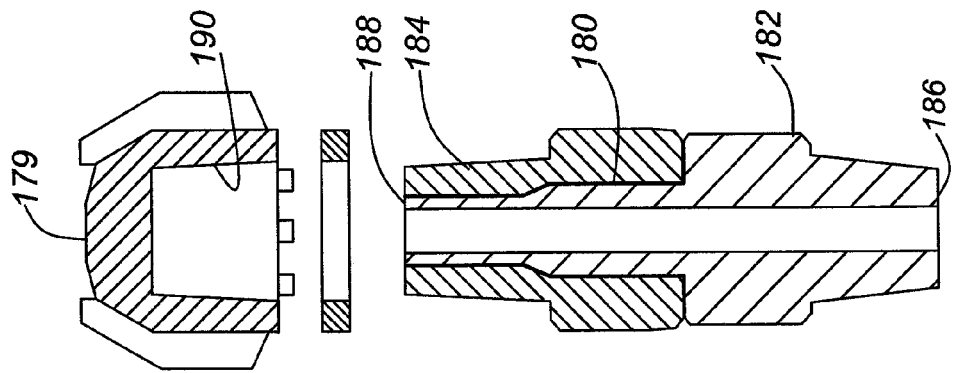
FIGS. 27(a) to (c) are a schematic exterior assembled and sectioned assembled and dissembled views of a two piece pin body having an electrically insulating gap joint between two pieces of the pin body according to another embodiment.
Figure 27B:
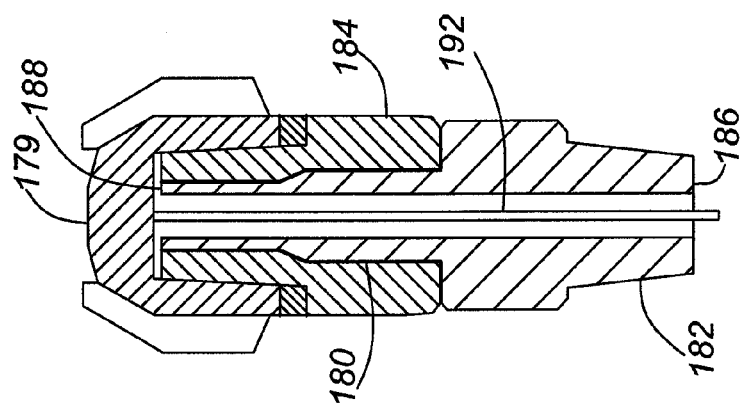
Figure 27C:
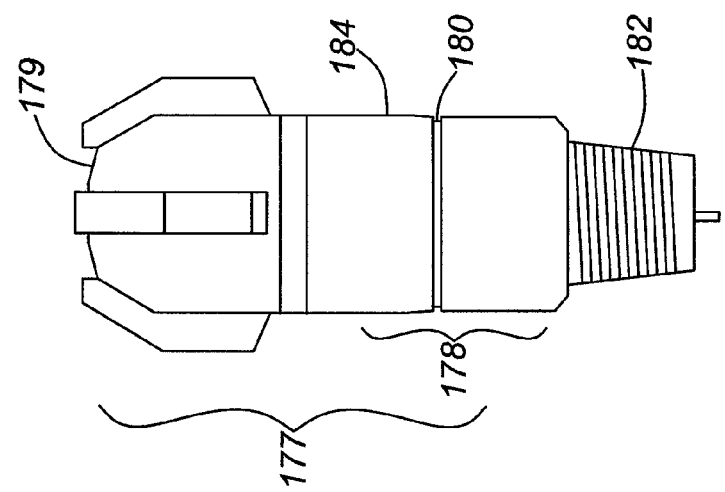

According to another alternative embodiment and referring to FIGS. 27(*a*) to (*c*), a drill bit assembly 177 having a two piece pin body 178 is provided with an insulating gap joint 180 between the engagement sections of the two pieces of the pin body 178. This second insulating gap joint 180 can be provided instead of or in addition to a gap joint (not shown) between the engagement sections of the pin body 178 and the bit head 179. In this alternative embodiment, the pin body 178 has an API pin piece 182 and a bit head pin piece 184. The API pin piece 182 has an API pin end 186 and a male threaded gap joint pin end 188. The male threads on the API pin piece 182 are threaded into female threads on bit head pin piece 184. The threads may have two different diameters to increase the holding strength of this connection. A thermoplastic injection technique as described for forming gap joint 34 can be applied to form the gap joint 180. Cavities or grooves (not shown) can be provided on the surface of one or both of the gap joint pin end 188 and bit head pin piece 184, in which thermoplastic will fill to form anti-rotation barriers (not shown). The bit head 179 has a female threaded bore 190 which mates with the male threads of the gap joint pin end 188. A conductor 192 can cross the second gap joint 180 and have one end contacting either the pin body 178 or as shown in these Figures, the bit head 179, and the other end in communication with electronics equipment such as EM telemetry circuitry or reservoir formation measurement equipment (not shown). The conductor 192 can extend through aligned ports in the annular portions of the API pin piece 182 and bit head pin piece, or as shown in these Figures, through the axial bore 190 of the pin body 178.

In yet another alternative embodiment, a two piece bit head is provided (not shown) and another insulating gap joint is provided between the two pieces of the bit head. Thermoplastic injection techniques as described above can be applied to form the gap joint. A conductor can be extended across the gap joint to have one end contact one of the bit head pieces and the other end to communicate with electronics equipment.

In yet another embodiment, other materials other than thermoplastic or ceramic can be used to form the gap joints 34, 180. The material can be an epoxy, or another polymer based material. Instead of pressurized injection, the thermoplastic, epoxy and other polymer based materials can fill the gap and barrier-forming cavities by potting, then solidified by curing. Curing can be done at atmospheric pressure, or more preferably under pressure to prevent or minimize the tendency for the material to expand out of the gap.

The metal and ceramic can be liquefied then cast into the gap and barrier forming cavities. Casting and potting can be performed at either atmospheric pressure or under a vacuum to gain the benefit of increased face friction between the joint material and the connecting parts. Instead of pouring a liquid ceramic into the gap, a ceramic powder can be applied into the gap then sintered to form the gap joint. Alternatively, a ceramic green compact can be machined to the exact dimensions of the gap (or produce a mold to compress the ceramic powder into a green compact with exact dimensions), and screw the bit head having a ceramic green compact screwed into the compact till the bit head bottoms, then screw the pin body into the compact this till the pin body bottoms. Then the barrier forming cavities would be filled with ceramic powder, the ceramic powder is then sintered to produce the gap and barriers.

While the present invention has been described herein by the preferred embodiments, it will be understood by those skilled in the art that various consistent and now obvious changes may be made and added to the invention. The changes and alternatives are considered within the spirit and scope of the present invention.

What is claimed is:

1. A drill bit assembly comprising
    an electrically conductive bit head having a cutting end, and an opposite connecting end with an engagement section;
    an electrically conductive pin body having a tubular body with an axial bore therethrough, and comprising a connecting end with an engagement section, the pin body connecting end positioned relative to the bit head connecting end such that the engagement sections overlap with an annular gap therebetween;
    an electrically insulating gap joint filling the annular gap between the bit head and pin body engagement sections such that the bit head and pin body are mechanically connected together at the connecting ends but electrically separated;
    an electrical conductor extending across the gap joint and having one end electrically contacting one of the bit head and pin body, and the other end communicable with electronics equipment;
    an electronics housing in at least one of the bit head and pin body, and having a communications port for the conductor to extend therethrough and communicate with electronics equipment in the electronics housing; and
    electronics equipment in the electronics housing and communicative with the conductor, the electronics equipment including electromagnetic telemetry circuitry, wherein the electromagnetic telemetry circuitry includes a processor, a digital/analog converter communicative with the processor for converting digital data from the processor into an analog data signal, a power amplifier communicative with the converter to amplify the signal and apply a resulting voltage of the signal across the insulated gap joint, thereby transmitting the signal upstring.

2. A borehole assembly comprising:
    a drill bit assembly of including
        an electrically conductive bit head having a cutting end, and an opposite connecting end with an engagement section;
        an electrically conductive pin body having a tubular body with an axial bore therethrough, and comprising a connecting end with an engagement section, the pin body connecting end positioned relative to the bit head connecting end such that the engagement sections overlap with an annular gap therebetween;

an electrically insulating gap joint filling the annular gap between the bit head and pin body engagement sections such that the bit head and pin body are mechanically connected together at the connecting ends but electrically separated; and an electrical conductor extending across the gap joint and having one end electrically contacting one of the bit head and pin body, and the other end communicable with electronics equipment; and a sub having an electronics housing, and electronics equipment in the electronics housing communicative with the conductor and including electromagnetic telemetry circuitry, wherein the sub is a rotary steerable system (RSS) sub and the electronics housing is located in at least one of an annular body of the RSS sub, an annular chassis of the RSS sub, and a mandrel cartridge of the RSS sub.

3. A method of manufacturing a drill bit assembly having a bit head with a cutting end and an opposite connecting end with an engagement section; and a pin body having a tubular body with an axial bore therethrough and comprising a connecting end with an engagement section, the method comprising:

(a) aligning the pin body connecting end with the bit head connecting end such that the engagement sections overlap with a gap therebetween;

(b) extending an electrical conductor across the gap and contacting one end of the electrical conductor with one of the bit head and pin body, and providing the other end of the electrical conductor to communicate with electronics equipment; and (c) injecting a liquid electrically insulating material into the gap and filling the gap and solidifying the electrically insulating material such that an electrically insulating gap joint is formed and the bit head and pin are mechanically connected together at the connecting ends but electrically separated.

4. A method as claimed in claim 3 further comprising extending the second end of the conductor through a communications port and into an electronics housing of the drill bit assembly and connecting the conductor to electronics equipment in the electronics housing.

5. A method as claimed in claim 4 further comprising connecting the conductor to a switch of the electronics equipment, the switch in switchable contact between electromagnetic telemetry circuitry and measurement circuitry of the electronics equipment.

6. A method as claimed in claim 4 wherein the electronics housing and the communications port is in the pin body and the bit head comprises a communications port, the method further comprises aligning the pin body communications port with the bit head communications port, and extending the conductor across the gap and into the bit head communications port to connect with the bit head and into the pin body communications port to connect with the electronics equipment.

7. A method as claimed in claim 6 further comprising forming an anti-rotation barrier by injecting the liquid electrically insulating material into the gap and into at least one cavity in at least one of the bit head engagement section and the pin body engagement section, and solidifying the electrically insulating material such that a segment of electrically insulating material protrudes into the cavity.

8. A method of manufacturing a borehole assembly comprising (a) manufacturing a drill bit assembly, the drill bit assembly including an electrically conductive bit head having a cutting end, and an opposite connecting end with an engagement section;

an electrically conductive pin body having a tubular body with an axial bore therethrough, and comprising a connecting end with an engagement section, the pin body connecting end positioned relative to the bit head connecting end such that the engagement sections overlap with an annular gap therebetween;

an electrically insulating gap joint filling the annular gap between the bit head and pin body engagement sections such that the bit head and pin body are mechanically connected together at the connecting ends but electrically separated; and an electrical conductor extending across the gap joint and having one end electrically contacting one of the bit head and pin body, and the other end communicable with electronics equipment;

(b) coupling an electronics equipment sub directly or indirectly via a connecting sub to the drill bit assembly, the electronics equipment sub having electronics equipment in an electronics housing of the electronics equipment sub, and (c) connecting the conductor to the electronics equipment in the electronics equipment sub, wherein the electronics equipment sub is a rotary steerable system (RSS) sub and the electronics housing is located in at least one of an annular body of the RSS sub, an annular chassis of the RSS sub, and a mandrel cartridge of the RSS sub.

9. A method as claimed in claim 8 wherein the RSS sub includes an insulated gap section, and electronics for measuring voltage generated across the insulated gap section.

10. A method as claimed in claim 9 wherein the electronics in RSS sub include an operational amplifier, an and a processor, and the RSS sub measures voltage across the insulated gap section by feeding a differential voltage into the amplifier, converting the output of the amplifier into a digital signal, an demodulating the signal by the processor.

11. A method of manufacturing a drill bit assembly having a bit head with a cutting end and an opposite connecting end with an engagement section; and a pin body having a tubular body with an axial bore therethrough and comprising a connecting end with an engagement section; and wherein at least one of the bit head and pin body comprises two mating pieces each having a mating end, the method comprising:

(a) positioning the engagement sections of the pin body and the bit head such that the pin body and the bit head are connected at their connecting ends;

(b) positioning the mating ends of the two mating pieces of the pin body or the bit head or both such that a gap is formed between the mating ends;

(c) extending an electrical conductor across the gap and contacting one end of the electrical conductor with one of the mating pieces, and providing the other end of the electrical conductor to communicate with electronics equipment; and (d) injecting a liquid electrically insulating material into the gap and filling the gap and solidifying the electrically insulating material such that an electrically insulating gap joint is formed and the two mating pieces of the bit head or pin body or both are mechanically connected together at the connecting ends but electrically separated.

12. A drill bit assembly comprising an electrically conductive bit head having a cutting end, and an opposite connecting end with an engagement section;

an electrically conductive pin body having a tubular body with an axial bore therethrough, and comprising a connecting end with an engagement section, the pin body connecting end positioned relative to the bit head connecting end such that the engagement sections overlap with an annular gap therebetween;

an electrically insulating gap joint filling the annular gap between the bit head and pin body engagement sections such that the bit head and pin body are mechanically connected together at the connecting ends but electrically separated;

an electrical conductor extending across the gap joint and having one end electrically contacting one of the bit head and pin body, and the other end communicable with electronics equipment;

an electronics housing in at least one of the bit head and pin body, and having a communications port for the conductor to extend therethrough and communicate with electronics equipment in the electronics housing; and electronics equipment in the electronics housing and communicative with the conductor, the electronics equipment including electromagnetic telemetry circuitry, wherein the electromagnetic telemetry circuitry includes an operational amplifier connected across the gap joint to detect a differential voltage across the gap joint, an analog/digital converter communicative with the amplifier for converting an analog signal associated with the differential voltage into a digital signal, and a processor communicative with the converter for processing the digital signal.

13. A drill bit assembly as claimed in claim 12 wherein the electronics housing is in the pin body and the conductor comprises a transmission wire electrically connected to the electronics equipment, a feed-through in the communications port and electrically connected to the transmission wire, and a wire electrically connected to the feed-through, extending across the gap joint and electrically connected to the bit head.

14. A drill bit assembly as claimed in claim 13 further comprising a bit head communications port in the bit head which is aligned with the communications port in the pin body and the wire extends across the gap joint into the bit head communications port to electrically connect to the bit head.

15. A drill bit assembly comprising
an electrically conductive bit head having a cutting end, and an opposite connecting end with an engagement section;
an electrically conductive pin body having a tubular body with an axial bore therethrough, and comprising a connecting end with an engagement section, the pin body connecting end positioned relative to the bit head connecting end such that the engagement sections overlap with an annular gap therebetween;
an electrically insulating gap joint filling the annular gap between the bit head and pin body engagement sections such that the bit head and pin body are mechanically connected together at the connecting ends but electrically separated;
an electrical conductor extending across the gap joint and having one end electrically contacting one of the bit head and pin body, and the other end communicable with electronics equipment;
an electronics housing in at least one of the bit head and pin body, and having a communications port for the conductor to extend therethrough and communicate with electronics equipment in the electronics housing; and
electronics equipment in the electronics housing and communicative with the conductor, the electronics equipment including electromagnetic telemetry circuitry, wherein the electronics equipment includes resistivity measurement circuitry for determining an alternating current conducted into the bit head and which induces an electromagnetic wave in a reservoir formation adjacent the drill bit assembly, the current being proportional to the resistivity of the reservoir formation, wherein the conductor electrically contacts the bit head, and is communicable with an alternating current signal and conducts the alternating current to the bit head, and wherein the electronic equipment further includes a switch electrically coupled to the conductor and switchable between the electromagnetic telemetry circuitry, and the measurement circuitry.

16. A drill bit assembly comprising
an electrically conductive bit head having a cutting end, and an opposite connecting end with an engagement section;
an electrically conductive pin body having a tubular body with an axial bore therethrough, and comprising a connecting end with an engagement section, the pin body connecting end positioned relative to the bit head connecting end such that the engagement sections overlap with an annular gap therebetween;
an electrically insulating gap joint filling the annular gap between the bit head and pin body engagement sections such that the bit head and pin body are mechanically connected together at the connecting ends but electrically separated; and
an electrical conductor extending across the gap joint and having one end electrically contacting one of the bit head and pin body, and the other end communicable with electronics equipment,
wherein the pin engagement section is a male threaded section and the bit head engagement section is a female threaded section, and the pin body is connected to the bit head by inserting the pin body connecting end into the bit head connecting end and threading the male and female threaded sections together, and wherein the pin further comprises an annular recess and a large root stress relief radius bridging the annular recess with the threaded section.

17. A drill bit assembly comprising
an electrically conductive bit head having a cutting end, and an opposite connecting end with an engagement section;
an electrically conductive pin body having a tubular body with an axial bore therethrough, and comprising a connecting end with an engagement section, the pin body connecting end positioned relative to the bit head connecting end such that the engagement sections overlap with an annular gap therebetween;
an electrically insulating gap joint filling the annular gap between the bit head and pin body engagement sections such that the bit head and pin body are mechanically connected together at the connecting ends but electrically separated;
an electrical conductor extending across the gap joint and having one end electrically contacting one of the bit head and pin body, and the other end communicable with electronics equipment; and
at least one cavity in at least one of the bit head engagement section and the pin body engagement section; and wherein the gap joint further comprises a segment protruding into each cavity to serve as an anti-rotation barrier.

18. A drill bit assembly as claimed in claim 17 wherein both the bit head and pin body comprise at least one cavity in each of their engagement surfaces, and the gap joint comprises a segment protruding into each of the cavities, namely a first segment that protrudes into a first cavity in the bit head engagement section, and a second segment that protrudes into a second cavity in the pin body engagement section.

19. A drill bit assembly as claimed in claim 18 wherein the gap joint is a dielectric thermoplastic material.

20. A drill bit assembly as claimed in claim 19 wherein the dielectric thermoplastic material comprises a liquid crystal polymer resin reinforced by glass fiber.

21. A drill bit assembly as claimed in claim 20 wherein the bit head and pin body engagement sections are threaded with matching threads, and the dielectric thermoplastic material is located between and around the matching threads.

22. A drill bit assembly as claimed in claim 20 wherein the cavity is a groove extending substantially parallel to an axis of the bit head and pin body and across multiple threads of at least one of the bit head and pin engagement sections.

* * * * *